(12) United States Patent
Raghavendra et al.

(10) Patent No.: US 12,474,867 B2
(45) Date of Patent: Nov. 18, 2025

(54) METHODS, APPARATUS, AND ARTICLES OF MANUFACTURE TO INTERLEAVE DATA ACCESSES FOR IMPROVED THROUGHPUT

(71) Applicant: Texas Instruments Incorporated, Dallas, TX (US)

(72) Inventors: Vignesh Raghavendra, Bengaluru (IN); Sriramakrishnan Govindarajan, Bengaluru (IN); Mihir Narendra Mody, Bengaluru (IN); Sai Karthik Rajaraman, Frisco, TX (US); Shailesh Ganapat Ghotgalkar, Bengaluru (IN); Mohammad Asif Farooqui, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 18 days.

(21) Appl. No.: 18/371,338

(22) Filed: Sep. 21, 2023

(65) Prior Publication Data

US 2025/0103244 A1    Mar. 27, 2025

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2003/0227800 A1* | 12/2003 | Saito | G11C 8/12 365/200 |
| 2010/0250827 A1* | 9/2010 | Jullien | G06F 12/0868 711/E12.001 |
| 2015/0081955 A1* | 3/2015 | Vucinic | G06F 3/061 710/5 |

OTHER PUBLICATIONS

Wikipedia, "Execute in place," Wikipedia Foundation, Inc., [https://en.wikipedia.org/w/index.php?title=Execute_in_place&oldid=1143979520] retrieved on Jul. 12, 2023, 3 pages.
Infineon, "AN220242: Flash accessing procedure for Traveo™ T2G family," Infineon Technologies AG., Dec. 28, 2021, 39 pages.

(Continued)

*Primary Examiner* — Daniel D Tsui
(74) *Attorney, Agent, or Firm* — Xianghui Huang; Frank D. Cimino

(57) ABSTRACT

An example apparatus includes a read queue to store a first read request to access a first storage, sequencing circuitry coupled to the read queue, and prioritization circuitry coupled to the sequencing circuitry and coupled to the first storage and a second storage via a shared bus. The example sequencing circuitry is to sequence a portion of a second request to access the second storage to be interleaved with a wait interval of the first read request, the second request queued after the first read request. Additionally, the example prioritization circuitry is to generate a first transaction to access the first storage over the shared bus and a second transaction to access the second storage over the shared bus concurrently with the first transaction, the first transaction based on the first read request, the second transaction based on the second request.

20 Claims, 15 Drawing Sheets

(56) References Cited

OTHER PUBLICATIONS

Huang, "Live over-the-air firmware updates to flash: which memory architecture gives the best combination of cost, reliability, and performance," EE Times, Jan. 9, 2019, [https://www.eetimes.com/live-over-the-air-firmware-updates-to-flash-which-memory-architecture-gives-the-best-combination-of-cost-reliability-and-performance/] retrieved on Sep. 21, 2023, 7 pages.
Wikipedia, "Over-the-air update," Wikipedia Foundation, Inc., [https://en.wikipedia.org/w/index.php?title=Over-the-air_update&oldid=1159359102] retrieved on Jul. 12, 2023, 6 pages.
Fulhorst, "Read and Execute: Prevent System Bottlenecks with Read While Write (RWW)," Renesas, Jun. 26, 2020, [https://www.renesas.com/us/en/blogs/read-and-execute-prevent-system-bottlenecks-read-while-write-rww] retrieved on Jul. 13, 2023, 4 pages.
Texas Instruments, "Jacinto7 DRA821 Evaluation Module (EVM) User's Guide," Texas Instruments Incorporated. Feb. 2022, 72 pages.

\* cited by examiner

METHODS, APPARATUS, AND ARTICLES OF MANUFACTURE TO INTERLEAVE DATA ACCESSES FOR IMPROVED THROUGHPUT

TECHNICAL FIELD

This description relates generally to embedded systems and, more particularly, to methods, apparatus, and articles of manufacture to interleave data accesses for improved throughput.

BACKGROUND

Manufacturers of integrated circuits (ICs) have developed techniques to manufacture compact ICs that incorporate components of a computer and/or other electronic system. Such ICs are referred to as Systems on a Chip (SoCs). Often, an SoC includes a central processor unit (CPU), memory, input/output ports, and storage, all on the same substrate. The memory and/or storage may be implemented by random access memory (RAM), ferroelectric random-access memory (FRAM), non-exclusive OR (NOR) flash, one-time programmable read only memory (OTP ROM), among others. SoCs may be configured to act as microcontrollers that are useful for processes that can be written into a coded set of instructions that can be executed to carry out a desired process in an automated fashion.

SUMMARY

For methods, apparatus, and articles of manufacture to interleave data accesses for improved throughput, an example apparatus includes a read queue to store a first read request to access a first storage, sequencing circuitry coupled to the read queue, and prioritization circuitry coupled to the sequencing circuitry and coupled to the first storage and the second storage via a shared bus. The example sequencing circuitry is to sequence a portion of a second request to access a second storage to be interleaved with a wait interval of the first read request, the second request queued after the first read request. Additionally, the example prioritization circuitry is to generate a first transaction to access the first storage over the shared bus and a second transaction to access the second storage over the shared bus concurrently with the first transaction, the first transaction based on the first read request, the second transaction based on the second request.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
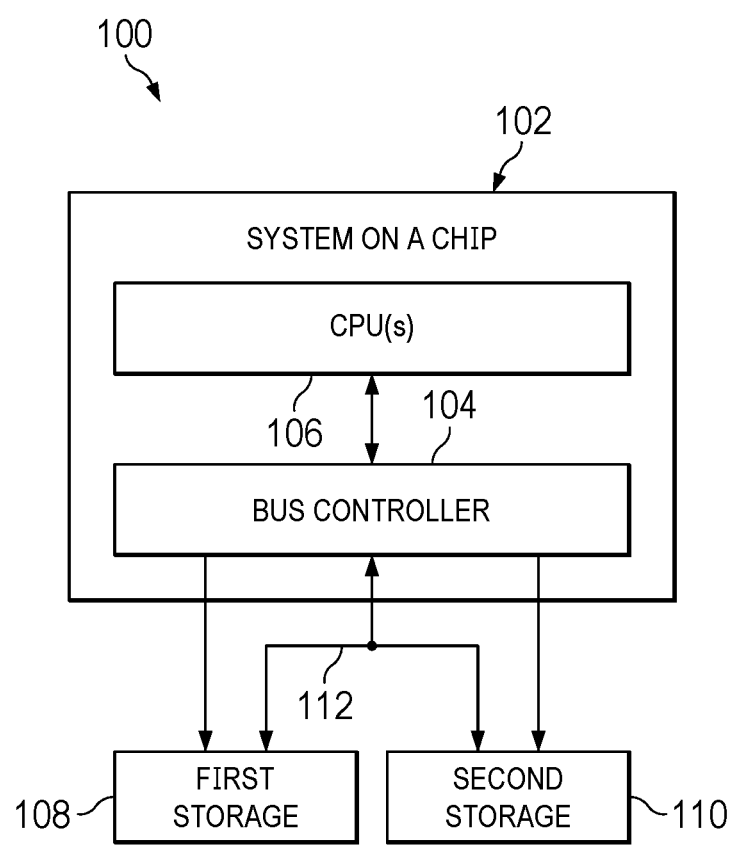
FIG. 1 is a block diagram of an example processor platform including an example System on a Chip (SoC) having an example bus controller.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

A compute device may include a System on a Chip (SoC) to implement an embedded system and/or other electronic system of the compute device. Embedded systems may be implemented in mobile devices, set-top boxes, automotive vehicles, telecommunication equipment, Internet of Things (IoT) devices, industrial equipment, etc. An SoC may include a central processor unit (CPU), memory, input/output (I/O) ports, and storage, all on the same substrate (e.g., semiconductor die). A CPU of an SoC may include multiple cores to accommodate applications in which the SoC is utilized. For example, a first core of a CPU can be utilized for non-safety-related operations and a second core of the CPU can be utilized for safety-related operations. Additionally or alternatively, a first core of a CPU can be utilized for non-real-time-related operations and a second core of the CPU can be utilized for real-time-related operations. Furthermore, a multi-core CPU provides scalability that can enhance the versatility of the CPU.

Examples of memory include volatile memory such as random access memory (RAM). RAM may be implemented by dynamic RAM (DRAM) and/or static RAM (SRAM). Examples of storage include non-volatile memory such as flash memory, hard disk drives (HDDs), solid state drives (SSDs), optical disks, read-only memory (ROM), erasable programmable ROM (EPROM), electrically erasable programmable ROM (EEPROM), ferroelectric RAM, among others. Although a particular storage component may be referred to using the term "memory," the storage component may nonetheless be considered storage as described herein.

As described above, an SoC may include memory and/or storage on the same semiconductor die as a CPU (e.g., the memory and/or storage are on-chip with the CPU). However, in modern integrated circuits (ICs), implementing storage on-chip with a CPU may present complications. For example, manufacturing processes (referred to as process nodes) for modern ICs are able to reliably form increasingly smaller features. As such, the size of components in modern ICs are getting smaller and smaller (e.g., on the nanometer scale). Such modern process nodes allow a CPU to operate faster and more efficiently. However, because ICs manufactured according to modern process nodes are on such small scales (e.g., nanometer scales), implementing sufficient on-chip storage for applications is impractical. As such, storage in modern compute devices may be implemented external to an SoC (e.g., off-chip, on a separate die, etc.). In some examples, when used in relation to two components, on-chip refers to a first component that is implemented on the same die as a second component whereas off-chip refers to a first component that is implemented on a different die than a second component.

As storage is commonly implemented off-chip, some example SoCs implement execute in place (XIP) read operations to improve performance. For example, XIP refers to executing one or more instructions directly from storage as opposed to copying the one or more instructions from the storage to memory and then executing the one or more instructions from the memory. While XIP read requests can improve SoC performance by reducing data movement, XIP read requests can present complications due to latency, bus contention, and other issues. For example, XIP read requests are random access read requests that are usually associated with relatively small amounts of data and a wait interval to allow the storage to access a new address region identified in the read request.

For example, for a CPU operating at 200 megahertz (MHZ), three clock cycles of a 32-byte XIP read request are associated with a command and address interval during which a command and address are transmitted from the CPU to storage, 20 clock cycles are associated with a wait interval during which the storage accesses data from the requested address, and 16 clock cycles are associated with a read interval during which the storage transmits the data to the CPU. As such, there is about a 50% overhead (e.g., 20/39=~0.5) in clock cycles to access a relatively small amount of data.

A read while write (RWW) operation has been adopted to reduce the number of wasted clock cycles associated with read requests. The RWW operation may schedule portions of the read operation during idle periods in a corresponding write operation. The RWW operation is particularly relevant to reduce the possibility of performance bottlenecks during over-the-air (OTA) updates and other write-heavy activity. For example, an update of an embedded system via a wireless network (e.g., a wireless fidelity (Wi-Fi) network, a cellular network, etc.) may be referred to as an over-the-air (OTA) update. A firmware over-the-air (FOTA) update may be used to refer to an update to firmware of an embedded system such as embedded systems in automotive vehicles and/or IoT devices. Before OTA updates, embedded systems were updated via direct physical access (e.g., via a Joint Test Action Group (JTAG) connector) or via a wired connection (e.g., a universal serial bus (USB) port, a serial port, etc.). As such, OTA updates allow for large scale updates to be deployed to embedded systems, reduce the cost of deploying updates to embedded systems, and/or increase the rate of adoption of an update among embedded systems.

However, the RWW operation may only improve performance when a write request and a read request are issued consecutively. As such, consecutive read requests targeting off-chip storage may still stall until a previous read request completes. Furthermore, with some RWW operations, a subsequent write request cannot be executed until a previous read request is completed. For example, a bus between a CPU and storage may be idle (e.g., not transmitting data to or receiving data from storage) during a wait interval of a read request (e.g., an XIP read request). As such, a CPU may not be able to issue a write request until after the read request is completed.

To address complications related to XIP read requests, some SoCs may include a shared bus to communicate with multiple flash memories. However, requests issued over the shared bus are serialized which may result in the shared bus remaining idle during wait intervals of XIP read requests. For example, consecutive XIP read requests targeting different flash memories may be stalled until the previous XIP read request completes. Additionally, because requests issued over the shared bus are serialized, multi-core CPUs may not be able to utilize such a shared bus. For example, multiple cores of a multi-core CPU may require concurrent access to the flash memories based on the respective operations of the cores.

Examples described herein include methods, apparatus, and articles of manufacture to interleave (e.g., pipeline) data accesses for improved throughput. For example, examples described herein include an SoC including one or more CPUs coupled to an example bus controller. The example bus controller is coupled to at least two storages implemented external to the SoC via a shared bus. The example bus controller described herein can control the at least two storages using independent select signals. The example bus controller described herein arbitrates multiple accesses to the at least two storages to facilitate workloads including multiple XIP read requests while also supporting RWW operation for OTA updates. For example, the bus controller interleaves XIP read requests with write requests and XIP read requests with XIP read requests. As such, examples described herein reduce clock cycles during which the shared bus is idle and improve scheduling of transactions with the at least two storages. For example, a transaction refers to one or more signals that are communicated to storage to facilitate a request to access the storage.

FIG. 1 is a block diagram of an example processor platform 100 including an example System on a Chip (SoC) 102 having an example bus controller 104. The example SoC also includes one or more example CPUs 106. The example processor platform 100 also includes an example first storage 108 and an example second storage 110. In the example of FIG. 1, the SoC 102 is implemented on a first semiconductor die whereas the first storage 108 and the second storage 110 are implemented on one or more other semiconductor dies. As such, the first storage 108 and the second storage 110 are implemented off-chip with respect to the SoC 102. In some examples, the first storage 108 is implemented on a second semiconductor die and the second storage 110 is implemented on a third semiconductor die. In some examples, the first storage 108 and the second storage 110 are both implemented on a second semiconductor die. In additional or alternative examples, the first storage 108 and/or the second storage 110 may be implemented in the same package as the SoC 102.

In the illustrated example of FIG. 1, the bus controller 104 includes one or more first terminals via which the bus controller 104 is coupled to the one or more CPUs 106. For example, the one or more first terminals of the bus controller 104 are coupled to an example system bus to which the one or more CPUs 106 are coupled. In the example of FIG. 1, the system bus is implemented by one or more electrical conductors to couple the bus controller 104 to the one or more CPUs 106. In the example of FIG. 1, the system bus is implemented in accordance with a Serial Peripheral Interface (SPI) specification. In additional or alternative examples, the system bus is implemented in accordance with at least one of an Inter-Integrated Circuit (I2C) specification, an Advanced Microcontroller Bus Architecture (AMBA) specification, among others.

In the illustrated example of FIG. 1, the bus controller 104 includes one or more second terminals via which the bus controller 104 is coupled to the first storage 108 and the second storage 110. For example, the one or more second terminals of the bus controller 104 are coupled to an example shared bus 112 to which the first storage 108 and the second storage 110 are coupled. In the example of FIG. 1, the bus controller 104 includes a third terminal via which the bus controller 104 is coupled to the first storage 108. Additionally, the bus controller 104 includes a fourth terminal via which the bus controller 104 is coupled to the second storage 110.

In the illustrated example of FIG. 1, the shared bus 112 is implemented by one or more electrical conductors to couple the bus controller 104 to the first storage 108 and the second storage 110. In the example of FIG. 1, the shared bus 112 is implemented in accordance with an SPI specification. In some examples, the shared bus 112 includes four I/O conductors as a quad SPI (QSPI) bus. In additional or alternative examples, the shared bus 112 includes eight I/O conductors as an octal SPI (OSPI) bus. In yet other examples, the shared bus 112 includes any number of I/O lines (e.g., an XSPI bus). In additional or alternative examples, the shared bus 112 is implemented in accordance with an I2C specification and/or any other serial bus specification.

In the illustrated example of FIG. 1, the first storage 108 includes one or more first terminals via which the first storage 108 is coupled to the bus controller 104. For example, one or more of the one or more first terminals of the first storage 108 are coupled to the shared bus 112 to which the bus controller 104 is coupled. Additionally, the first storage 108 includes a second terminal via which the first storage 108 is coupled to the bus controller 104. In the example of FIG. 1, the first storage 108 is implemented by non-volatile memory such as flash memory. In additional or alternative examples, the first storage 108 may be implemented by one or more mass storage devices such as HDD(s), CD drive(s), DVD drive(s), SSD drive(s), etc. In alternative examples, the first storage 108 may instead be implemented by memory (e.g., RAM, DRAM, SRAM, etc.).

In the illustrated example of FIG. 1, the first storage 108 is configured to store and/or otherwise record data. Example data may correspond to a program, an operating system, an application, a configuration setting, a parameter (e.g., an encryption key). For example, the data stored in the first storage 108 corresponds to one or more instructions. The one or more instructions may be executed by the one or more CPUs 106 to operate the SoC 102 for a particular application.

While in the illustrated example the first storage 108 is illustrated as a single storage, the first storage 108 may be implemented by any number and/or type(s) of storages. Furthermore, the data stored in the first storage 108 may be in any data format such as, for example, binary data, comma delimited data, tab delimited data, structured query language (SQL) structures, an executable (e.g., an executable binary, an ML configuration image, etc.), etc. In some examples, the first storage 108 is partitioned into two or more regions where each region corresponds to particular addresses. In some examples, data stored in a first region of the first storage 108 is duplicated in a second region of the second storage 110.

In the illustrated example of FIG. 1, the second storage 110 includes one or more first terminals via which the second storage 110 is coupled to the bus controller 104. For example, the one or more first terminals of the second storage 110 are coupled to the shared bus 112 to which the bus controller 104 is coupled. Additionally, the second storage 110 includes a second terminal via which the second storage 110 is coupled to the bus controller 104. In the example of FIG. 1, the second storage 110 is implemented by non-volatile memory such as flash memory. In additional or alternative examples, the second storage 110 may be implemented by one or more mass storage devices such as HDD(s), CD drive(s), DVD drive(s), SSD drive(s), etc. In alternative examples, the second storage 110 may instead be implemented by memory (e.g., RAM, DRAM, SRAM, etc.).

In the illustrated example of FIG. 1, the second storage 110 is configured to store and/or otherwise record data. Example data may correspond to a program, an operating system, an application, a configuration setting, a parameter (e.g., an encryption key). For example, the data stored in the second storage 110 corresponds to one or more instructions. The one or more instructions may be executed by the one or more CPUs 106 to operate the SoC 102 for a particular application.

While in the illustrated example the second storage 110 is illustrated as a single storage, the second storage 110 may be implemented by any number and/or type(s) of storages. Furthermore, the data stored in the second storage 110 may be in any data format such as, for example, binary data, comma delimited data, tab delimited data, SQL structures, an executable (e.g., an executable binary, an ML configuration image, etc.), etc. In some examples, the second storage 110 is partitioned into two or more regions where each region corresponds to particular addresses. In some examples, data stored in a first region of the second storage 110 is duplicated in a second region of the first storage 108.

In the illustrated example of FIG. 1, the one or more CPUs 106 issue one or more requests to access the first storage 108 and/or the second storage 110. For example, the one or more CPUs 106 may be one or more multi-core CPUs. As such, a first core of the one or more CPUs 106 may issue a first request to access the first storage 108 or the second storage 110 concurrently with a second request to access the first storage 108 or the second storage 110 from a second core of the one or more CPUs 106. In some examples, the one or more CPUs 106 may be implemented as one or more cores of the same CPU. Requests to access the first storage 108 and/or the second storage 110 include random access read requests, non-random access read requests (e.g., sequential read requests), write requests, and write completion polling requests.

An example random access read request corresponds to a read request to a random address in the first storage 108 and/or the second storage 110 (e.g., a read operation requesting data from a first address that does not sequentially follow a second address of a previous read operation). Example random access read requests may correspond to read requests for small amounts of data, such as read requests associated with code execution (e.g., XIP read requests). Each example random access read request is associated with an example wait interval because the storage (e.g., the first storage 108 and/or the second storage 110) may have to access a different region of the storage from a previous read request.

An example non-random access read request corresponds to a read request associated with a sequential read of the first storage 108 and/or the second storage 110 (e.g., a sequence of read operations requesting data from a first address and continuing in sequence up to a second address). For example, a non-random access read request may correspond to read requests for large amount of data, such as read requests associated with an image. An example non-random access read request is not associated with an example wait interval because the storage (e.g., the first storage 108 and/or the second storage 110) does not have to access a different region of the storage from a previous read request. As such, in some examples, only the first non-random access read request in a sequence of non-random read requests will be subject to a wait interval.

An example write request corresponds to a request to write data to the first storage 108 and/or the second storage 110. For example, a write request may be associated with an OTA update of the SoC 102. An example write completion polling request corresponds to a request to confirm (e.g., poll) whether a write request has completed. For example, a write completion polling request corresponds to a request to read a status register of the first storage 108 and/or the second storage 110.

In example operation, the bus controller 104 queues requests received from the one or more CPUs 106 and interleaves two or more of the requests to improve performance of the processor platform 100. For example, the bus controller 104 sequences a first random access read request to be interleaved (e.g., to overlap) with a second random access read request. Additionally or alternatively, the bus controller 104 sequences a write request to be interleaved (e.g., to overlap) with a random access read request. In some examples, the bus controller 104 sequences a write completion polling request to be interleaved (e.g., to overlap) with a random access read request.

Figure 2:
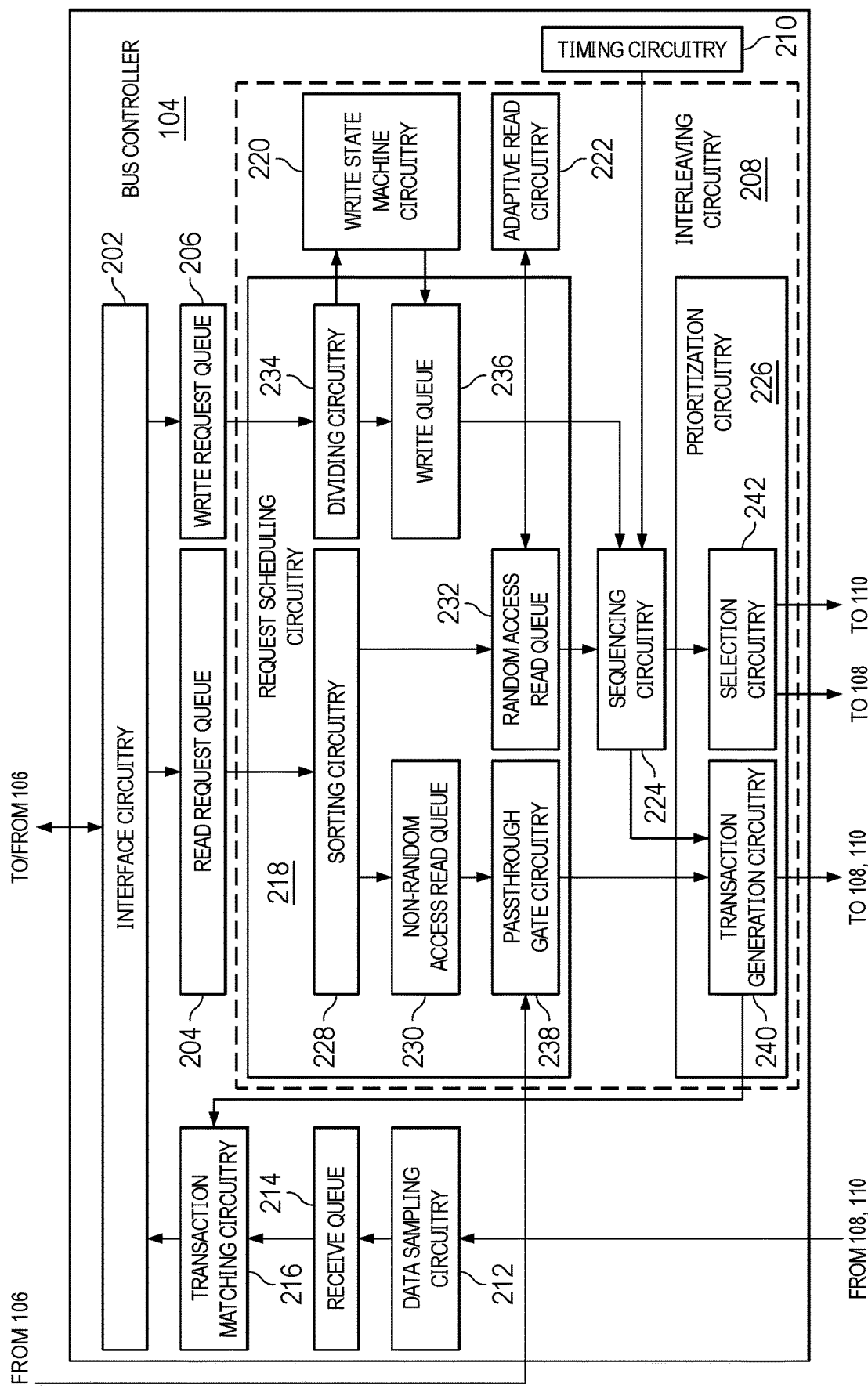
FIG. 2 is a block diagram of an example implementation of the example bus controller of FIG. 1.

FIG. 2 is a block diagram of an example implementation of the example bus controller 104 of FIG. 1. In the example of FIG. 2, the bus controller 104 includes example interface circuitry 202, an example read request queue 204, an example write request queue 206, example interleaving circuitry 208, example timing circuitry 210, example data sampling circuitry 212, an example receive queue 214, and example transaction matching circuitry 216. The example interleaving circuitry 208 includes example request scheduling circuitry 218, example write state machine circuitry 220, example adaptive read circuitry 222, example sequencing circuitry 224, and example prioritization circuitry 226. In the example of FIG. 2, the request scheduling circuitry 218 includes example sorting circuitry 228, an example non-random access read queue 230, an example random access read queue 232, example dividing circuitry 234, an example write queue 236, and example passthrough gate circuitry 238. In the example of FIG. 2, the example prioritization circuitry 226 includes example transaction generation circuitry 240 and example selection circuitry 242.

In the illustrated example of FIG. 2, the bus controller 104 is instantiated (e.g., creating an instance of, bring into being for any length of time, materialize, implement, etc.) by programmable circuitry. As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAS to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

In one example, the bus controller 104 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of first instructions to perform operations (e.g., operations described in connection with the bus controller 104). Additionally or alternatively, the bus controller 104 of FIG. 2 may be instantiated (e.g., creating an instance of, bring into being for any length of time, materialize, implement, etc.) by programmable circuitry such as a Central Processor Unit (CPU) executing second instructions corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

In the illustrated example of FIG. 2, the interface circuitry 202 includes dual purpose terminals (e.g., input and/or output terminals), an input terminal, a first output terminal, and a second output terminal. As used herein, the term dual purpose terminal refers to a terminal that includes two purposes. For example, dual purpose terminals can operate as both an input terminal and an output terminal. In the example of FIG. 2, the dual purpose terminals of the interface circuitry 202 are coupled to one or more CPUs 106 of FIG. 1 (e.g., via the system bus). Additionally, the input terminal of the interface circuitry 202 is coupled to the transaction matching circuitry 216. In the example of FIG. 2, the first output terminal of the interface circuitry 202 is coupled to the read request queue 204. Additionally, the second output terminal of the interface circuitry 202 is coupled to the write request queue 206.

In the illustrated example of FIG. 2, the interface circuitry 202 is implemented by programmable circuitry. For example, the interface circuitry 202 may be implemented by hardware circuitry, such as logic circuitry (e.g., sequential logic circuitry and/or combinational logic circuitry) implemented in silicon, and/or logic circuitry programmed by firmware. In additional or alternative examples, the interface circuitry 202 may be implemented by hardware, firmware, and/or software. In the example of FIG. 2, the interface circuitry 202 monitors the one or more CPUs 106 for one or more requests to access the first storage 108 and/or the second storage 110. Based on receiving a request to access the first storage 108 or the second storage 110, the interface circuitry 202 determines whether the request is a read request or a write request. When the interface circuitry 202 determines that the request is a read request, the interface circuitry 202 adds the request to the read request queue 204. When the interface circuitry 202 determines that the request is a write request, the interface circuitry 202 adds the request to the write request queue 206.

Additionally, the interface circuitry 202 forwards data received from the first storage 108 and/or the second storage 110 to the one or more CPUs 106. For example, the interface circuitry 202 communicates with the transaction matching circuitry 216 to identify a CPU that is associated with the data accessed from the first storage 108 and/or the second storage 110 during one or more transactions. Based on the identified CPU, the interface circuitry 202 forwards the data to the identified CPU. In some examples, the interface circuitry 202 is instantiated by programmable circuitry executing interfacing instructions and/or configured to perform operations such as those represented by the flowchart(s) of FIG. 8.

In some examples, the bus controller 104 includes means for interfacing. For example, the means for interfacing may be implemented by the interface circuitry 202. In some examples, the interface circuitry 202 may be instantiated by programmable circuitry such as the example programmable circuitry 1112 of FIG. 11. For instance, the interface circuitry 202 may be instantiated by an example microprocessor executing machine-executable instructions such as those implemented by at least blocks 802, 804, 806, 808, and 840 of FIG. 8. In some examples, the interface circuitry 202 may be instantiated by hardware logic circuitry, which may be implemented by an ASIC, XPU, or the FPGA circuitry 1200 of FIG. 12 configured and/or structured to perform operations corresponding to the machine-readable instructions. Additionally or alternatively, the interface circuitry 202 may be instantiated by any other combination of hardware, software, and/or firmware. For example, the interface circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the read request queue 204 includes an input terminal and an output terminal. In the example of FIG. 2, the input terminal of the read request queue 204 is coupled to the first output terminal of the interface circuitry 202. Additionally, the output terminal of the read request queue 204 is coupled to the sorting circuitry 228. In the example of FIG. 2, the read request queue 204 is implemented by volatile memory. For example, the read request queue 204 is implemented by a first-in-first-out (FIFO) queue in RAM. Additionally or alternatively, the read request queue 204 may be implemented by any other type of data structure in memory such as a circular buffer in RAM. In the example of FIG. 2, the read request queue 204 stores one or more read requests including non-random access read requests and random access read requests.

In the illustrated example of FIG. 2, the write request queue 206 includes an input terminal and an output terminal. In the example of FIG. 2, the input terminal of the write request queue 206 is coupled to the second output terminal of the interface circuitry 202. Additionally, the output terminal of the write request queue 206 is coupled to the dividing circuitry 234. In the example of FIG. 2, the write request queue 206 is implemented by volatile memory. For example, the write request queue 206 is implemented by a FIFO queue in RAM. Additionally or alternatively, the write request queue 206 may be implemented by any other type of data structure in memory such as a circular buffer in RAM. In the example of FIG. 2, the write request queue 206 stores one or more write requests and/or one or more write completion polling requests.

In the illustrated example of FIG. 2, the interleaving circuitry 208 includes a first input terminal, a second input terminal, a third input terminal, a fourth input terminal, a first output terminal, one or more second output terminals, a third output terminal, and a fourth output terminal. In the example of FIG. 2, the first input terminal of the interleaving circuitry 208 is coupled to the one or more CPUs 106. Additionally, the second input terminal of the interleaving circuitry 208 is coupled to the output terminal of the read request queue 204. In the example of FIG. 2, the third input terminal of the interleaving circuitry 208 is coupled to the output terminal of the write request queue 206. Additionally, the fourth input terminal of the interleaving circuitry 208 is coupled to the timing circuitry 210.

In the illustrated example of FIG. 2, the first output terminal of the interleaving circuitry 208 is coupled to the transaction matching circuitry 216. In the example of FIG. 2, the one or more second output terminals of the interleaving circuitry 208 is coupled to the first storage 108 and the second storage 110 (via the shared bus 112). In the example of FIG. 2, the third output terminal of the interleaving circuitry 208 is coupled to the first storage 108. Additionally, the fourth output terminal of the interleaving circuitry 208 is coupled to the second storage 110.

In the illustrated example of FIG. 2, the interleaving circuitry 208 is implemented by programmable circuitry. For example, the interleaving circuitry 208 may be implemented by hardware circuitry, such as logic circuitry (e.g., sequential logic circuitry and/or combinational logic circuitry) implemented in silicon, and/or logic circuitry programmed by firmware. In additional or alternative examples, the interleaving circuitry 208 may be implemented by hardware, firmware, and/or software. In the example of FIG. 2, the interleaving circuitry 208 intelligently interleaves read requests, write requests, and/or write completion polling requests based on timing information of the first storage 108 and/or the second storage 110. For example, the interleaving circuitry 208 interleaves multiple read requests, interleaves a write request under a read request, and/or interleaves a write completion polling request under a read request.

In the illustrated example of FIG. 2, the interleaving circuitry 208 examines wait intervals associated with requests to access the first storage 108 and/or the second storage 110, data sizes associated with the requests to access the first storage 108 and/or the second storage 110, and whether read requests and/or write-related requests can be interleaved. By interleaving requests to access the first storage 108 and the second storage 110, the interleaving circuitry 208 optimally schedules transaction to access the first storage 108 and the second storage 110 and reduces clock cycles during which the shared bus 112 is idle. In some examples, the interleaving circuitry 208 is instantiated by programmable circuitry executing interleaving instructions and/or configured to perform operations such as those represented by the flowchart(s) of FIGS. 8, 9, and/or 10.

In some examples, the bus controller 104 includes means for interleaving requests to access data. For example, the means for interleaving requests to access data may be implemented by the interleaving circuitry 208. In some examples, the interleaving circuitry 208 may be instantiated by programmable circuitry such as the example programmable circuitry 1112 of FIG. 11. For instance, the interleaving circuitry 208 may be instantiated by an example microprocessor executing machine-executable instructions such as those implemented by at least blocks 802, 804, 806, 808, 810, 812, 814, 816, 818, 820, 822, 824, 826, 828, 830, 832, 834, 836, 838, and 840 of FIG. 8, at least blocks 902 and 904 of FIG. 9, and/or at least blocks 1002, 1004, 1006, 1008, 1010, 1012, 1014, 1016, 1018, 1020, 1022, 1024, 1026, and 1028 of FIG. 10. In some examples, the interleaving circuitry 208 may be instantiated by hardware logic circuitry, which may be implemented by an ASIC, XPU, or the FPGA circuitry 1200 of FIG. 12 configured and/or structured to perform operations corresponding to the machine-readable instructions. Additionally or alternatively, the interleaving circuitry 208 may be instantiated by any other combination of hardware, software, and/or firmware. For example, the interleaving circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the timing circuitry 210 includes an output terminal. For example, the output terminal of the timing circuitry 210 is coupled to the sequencing circuitry 224. In the example of FIG. 2, the timing circuitry 210 is implemented by programmable circuitry. For example, the timing circuitry 210 may be implemented by one or more registers that can be programmed by firmware. Additionally, for example, the one or more registers of the timing circuitry 210 may be implemented by one or more hardware registers that are programmed (e.g., by software and/or firmware). Additionally or alternatively, the one or more registers of the timing circuitry 210 may be implemented by non-volatile read only memory. In some examples, the timing circuitry 210 may be implemented by hardware, firmware, and/or software.

In the illustrated example of FIG. 2, the timing circuitry 210 is programmed with indications of: a number of clock cycles associated with a wait interval of a read request for data from the first storage 108, a number of clock cycles associated with a wait interval of a read request for data from the second storage 110, how often a transaction to facilitate a write completion polling request is to be issued, and an offset (e.g., a timing difference) between a select signal being asserted and a subsequent transaction being issued to the first storage 108 and/or the second storage 110. Additionally, the timing circuitry 210 is programmed with indications of: a priority level of random access read requests as compared to non-random access read requests and write-related requests (e.g., write requests and write completion polling requests) and an interleaving scheme for the interleaving circuitry 208 (e.g., which requests are to be interleaved with read requests). In the example of FIG. 2, the timing circuitry 210 is programmed with other timing information to reduce the probability of concurrent transactions to access data from clashing. For example, the timing information can be derived from a datasheet of the first storage 108 and/or a datasheet of the second storage 110. In some examples, the timing circuitry 210 is instantiated by programmable circuitry executing timing instructions and/or configured to perform operations such as those described herein.

In some examples, the bus controller 104 includes means for timing. For example, the means for timing may be implemented by the timing circuitry 210. In some examples, the timing circuitry 210 may be instantiated by programmable circuitry such as the example programmable circuitry 1112 of FIG. 11. For instance, the timing circuitry 210 may be instantiated by an example microprocessor executing machine-executable instructions. In some examples, the timing circuitry 210 may be instantiated by hardware logic circuitry, which may be implemented by an ASIC, XPU, or the FPGA circuitry 1200 of FIG. 12 configured and/or structured to perform operations corresponding to the machine-readable instructions. Additionally or alternatively, the timing circuitry 210 may be instantiated by any other combination of hardware, software, and/or firmware. For example, the timing circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the data sampling circuitry 212 includes one or more input terminals and an output terminal. For example, the one or more input terminals of the data sampling circuitry 212 are coupled to the first storage 108 and the second storage 110 (via the shared bus 112). Additionally, the output terminal of the data sampling circuitry 212 is coupled to the receive queue 214. In the example of FIG. 2, the data sampling circuitry 212 is implemented by programmable circuitry. For example, the data sampling circuitry 212 may be implemented by hardware circuitry such as logic circuitry (e.g., sequential logic circuitry and/or combinational logic circuitry) implemented in silicon. In additional or alternative examples, the data sampling circuitry 212 may be implemented by hardware, firmware, and/or software.

In the illustrated example of FIG. 2, the data sampling circuitry 212 accesses data from the first storage 108 and/or the second storage 110. For example, based on a transaction to facilitate a read request, the first storage 108 and/or the second storage 110 returns data stored in the first storage 108 and/or the second storage 110. To read the data from the first storage 108 and/or the second storage 110, the data sampling circuitry 212 samples data transmitted over the shared bus 112. In some examples, the data sampling circuitry 212 is instantiated by programmable circuitry executing timing instructions and/or configured to perform operations such as those described herein.

In some examples, the bus controller 104 includes means for sampling. For example, the means for sampling may be implemented by the data sampling circuitry 212. In some examples, the data sampling circuitry 212 may be instantiated by programmable circuitry such as the example programmable circuitry 1112 of FIG. 11. For instance, the data sampling circuitry 212 may be instantiated by an example microprocessor executing machine-executable instructions. In some examples, the data sampling circuitry 212 may be instantiated by hardware logic circuitry, which may be implemented by an ASIC, XPU, or the FPGA circuitry 1200 of FIG. 12 configured and/or structured to perform operations corresponding to the machine-readable instructions. Additionally or alternatively, the data sampling circuitry 212 may be instantiated by any other combination of hardware, software, and/or firmware. For example, the data sampling circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the receive queue 214 includes an input terminal and an output terminal. In the example of FIG. 2, the input terminal of the receive queue 214 is coupled to the output terminal of the data sampling circuitry 212. Additionally, the output terminal of the receive queue 214 is coupled to the transaction matching circuitry 216. In the example of FIG. 2, the receive queue 214 is implemented by volatile memory. For example, the receive queue 214 is implemented by a FIFO queue in RAM. Additionally or alternatively, the receive queue 214 may be implemented by any other type of data structure in memory such as a circular buffer in RAM. In the example of FIG. 2, the receive queue 214 stores data received from the first storage 108 and/or the second storage 110 (e.g., data requested by a read request, the results of a write completion polling request, etc.).

In the illustrated example of FIG. 2, the transaction matching circuitry 216 includes a first input terminal, a second input terminal, and an output terminal. For example, the first input terminal of the transaction matching circuitry 216 is coupled to the output terminal of the receive queue 214. Additionally, the second input terminal of the transaction matching circuitry 216 is coupled to the transaction generation circuitry 240. In the example of FIG. 2, the output terminal of the transaction matching circuitry 216 is coupled to the input terminal of the interface circuitry 202. In the example of FIG. 2, the transaction matching circuitry 216 is implemented by programmable circuitry. For example, the transaction matching circuitry 216 may be implemented by hardware circuitry, such as logic circuitry (e.g., sequential logic circuitry and/or combinational logic circuitry) implemented in silicon, and/or logic circuitry programmed by firmware. In additional or alternative examples, the transaction matching circuitry 216 may be implemented by hardware, firmware, and/or software.

In the illustrated example of FIG. 2, the transaction matching circuitry 216 accesses data from the receive queue 214. For example, data stored in the receive queue 214 may correspond to one or more transactions generated by the transaction generation circuitry 240. To match data stored in the receive queue 214 to a transaction generated by the transaction generation circuitry 240, the transaction matching circuitry 216 compares a transaction token (received from the transaction generation circuitry 240) to transaction tokens included in the data stored in the received queue 214. In this manner, the transaction matching circuitry 216 identifies a CPU and/or core of a CPU to which the interface circuitry 202 is to forward the data. In some examples, the transaction matching circuitry 216 is instantiated by programmable circuitry executing transaction matching instructions and/or configured to perform operations such as those described herein.

In some examples, the bus controller 104 includes means for matching. For example, the means for matching may be implemented by the transaction matching circuitry 216. In some examples, the transaction matching circuitry 216 may be instantiated by programmable circuitry such as the example programmable circuitry 1112 of FIG. 11. For instance, the transaction matching circuitry 216 may be instantiated by an example microprocessor executing machine-executable instructions. In some examples, the transaction matching circuitry 216 may be instantiated by hardware logic circuitry, which may be implemented by an ASIC, XPU, or the FPGA circuitry 1200 of FIG. 12 configured and/or structured to perform operations corresponding to the machine-readable instructions. Additionally or alternatively, the transaction matching circuitry 216 may be instantiated by any other combination of hardware, software, and/or firmware. For example, the transaction matching circuitry 216 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

As described above, the interleaving circuitry 208 includes the example request scheduling circuitry 218, the example write state machine circuitry 220, the example adaptive read circuitry 222, the example sequencing circuitry 224, and the example prioritization circuitry 226. In the example of FIG. 2, the request scheduling circuitry 218 includes a first input terminal, a second input terminal, a third input terminal, a fourth input terminal, a first output terminal, a second output terminal, a third output terminal, a fourth output terminal, and a dual-purpose terminal.

In the illustrated example of FIG. 2, the first input terminal of the request scheduling circuitry 218 is coupled to the one or more CPUs 106 of FIG. 1. Additionally, the second input terminal of the request scheduling circuitry 218 is coupled to the output terminal of the read request queue 204. In the example of FIG. 2, the third input terminal of the request scheduling circuitry 218 is coupled to the output terminal of the write request queue 206. The fourth input terminal of the example request scheduling circuitry 218 is coupled to the write state machine circuitry 220.

In the illustrated example of FIG. 2, the first output terminal of the request scheduling circuitry 218 is coupled to the prioritization circuitry 226. Additionally, the second output terminal and the third output terminal of the request scheduling circuitry 218 are coupled to the sequencing circuitry 224. In the example of FIG. 2, the fourth output terminal of the request scheduling circuitry 218 is coupled to the write state machine circuitry 220. Additionally, in the example of FIG. 2, the dual-purpose terminal of the request scheduling circuitry 218 is coupled to the adaptive read circuitry 222.

In the illustrated example of FIG. 2, the request scheduling circuitry 218 is implemented by programmable circuitry. For example, the request scheduling circuitry 218 may be implemented by hardware circuitry, such as logic circuitry (e.g., sequential logic circuitry and/or combinational logic circuitry) implemented in silicon, and/or logic circuitry programmed by firmware. In additional or alternative examples, the request scheduling circuitry 218 may be implemented by hardware, firmware, and/or software. In the example of FIG. 2, the request scheduling circuitry 218 detects non-random access read requests (e.g., contiguous accesses of the first storage 108 and/or the second storage 110, large read requests, etc.) and random access read requests (e.g., XIP read requests).

In the illustrated example of FIG. 2, for non-random access read requests (e.g., contiguous accesses of the first storage 108 and/or the second storage 110, large read requests, etc.), the request scheduling circuitry 218 bypasses the sequencer circuitry 224 and can be prioritized based on an input from the one or more CPUs 106 (e.g., at the first input terminal of the request scheduling circuitry 218). Additionally, the request scheduling circuitry 218 divides write requests that are requesting to write a threshold size of data to the first storage 108 and/or the second storage 110 into two or more write requests. In some examples, the request scheduling circuitry 218 is instantiated by programmable circuitry executing request scheduling instructions and/or configured to perform operations such as those represented by the flowchart(s) of FIG. 8.

In some examples, the bus controller 104 includes means for scheduling. For example, the means for scheduling may be implemented by the request scheduling circuitry 218. In some examples, the request scheduling circuitry 218 may be instantiated by programmable circuitry such as the example programmable circuitry 1112 of FIG. 11. For instance, the request scheduling circuitry 218 may be instantiated by an example microprocessor executing machine-executable instructions such as those implemented by at least blocks 810, 812, 814, 816, 818, 820, and 822 of FIG. 8. In some examples, the request scheduling circuitry 218 may be instantiated by hardware logic circuitry, which may be implemented by an ASIC. XPU, or the FPGA circuitry 1200 of FIG. 12 configured and/or structured to perform operations corresponding to the machine-readable instructions. Additionally or alternatively, the request scheduling circuitry 218 may be instantiated by any other combination of hardware, software, and/or firmware. For example, the request scheduling circuitry 218 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the write state machine circuitry 220 includes an input terminal and an output terminal. In the example of FIG. 2, the input terminal of the write state machine circuitry 220 is coupled to the dividing circuitry 234. Additionally, the output terminal of the write state machine circuitry 220 is coupled to the write queue 236. In the example of FIG. 2, the write state machine circuitry 220 is implemented by programmable circuitry. For example, the write state machine circuitry 220 may be implemented by logic circuitry programmed by firmware. In additional or alternative examples, the write state machine circuitry 220 may be implemented by hardware, firmware, and/or software.

In the illustrated example of FIG. 2, the write state machine circuitry 220 determines whether one or more requests to access the first storage 108 and/or the second storage 110 include a write request. For example, the write state machine circuitry 220 monitors the write queue 236. Based on a write request being present in the one or more requests to access the first storage 108 and/or the second storage 110, the write state machine circuitry 220 adds a write completion polling request to the write queue 236. As such, the write state machine circuitry 220 feeds a write completion polling sequence into the write queue 236 to be pipelined over read requests.

In the illustrated example of FIG. 2, the write state machine circuitry 220 tracks when a write request has been divided into two or more write requests to write smaller amounts of data to the first storage 108 and/or the second storage 110. Additionally, the write state machine circuitry 220 tracks how much data has been written to the first storage 108 and/or the second storage 110 and polled for completion. For example, if an initial write request was divided into two write requests, the write state machine circuitry 220 tracks whether the first write request and the second write request have been issued and whether the first write request and the second write request have been completed. In some examples, the write state machine circuitry 220 is instantiated by programmable circuitry executing write completion polling instructions and/or configured to perform operations such as those represented by the flowchart(s) of FIG. 8.

In some examples, the bus controller 104 includes means for polling write completion. For example, the means for polling write completion may be implemented by the write state machine circuitry 220. In some examples, the write state machine circuitry 220 may be instantiated by programmable circuitry such as the example programmable circuitry 1112 of FIG. 11. For instance, the write state machine circuitry 220 may be instantiated by an example microprocessor executing machine-executable instructions such as those implemented by at least blocks 832 and 834 of FIG. 8. In some examples, the write state machine circuitry 220 may be instantiated by hardware logic circuitry, which may be implemented by an ASIC, XPU, or the FPGA circuitry 1200 of FIG. 12 configured and/or structured to perform operations corresponding to the machine-readable instructions. Additionally or alternatively, the write state machine circuitry 220 may be instantiated by any other combination of hardware, software, and/or firmware. For example, the write state machine circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the adaptive read circuitry 222 includes a dual-purpose terminal. In the example of FIG. 2, dual purpose terminal of the adaptive read circuitry 222 is coupled to the random access read queue 232. In the example of FIG. 2, the adaptive read circuitry 222 is implemented by logic circuitry programmed by firmware. In additional or alternative examples, the adaptive read circuitry 222 may be implemented by hardware, firmware, and/or software.

In the illustrated example of FIG. 2, the adaptive read circuitry 222 adjusts one or more read requests in the random access read queue 232. For example, the adaptive read circuitry 222 determines whether an address of a read request to the same storage (e.g., the first storage 108) as a previous read request is mapped to a region of the storage (e.g., the first storage 108) that is duplicated in a region of the other storage (e.g., the second storage 110). As described above, in some examples, data stored in a first region of the first storage 108 is duplicated in a second region of the second storage 110. For example, the adaptive read circuitry 222 maintains a copy of data in mirrored regions of the first storage 108 and the second storage 110.

In the illustrated example of FIG. 2, based on the adaptive read circuitry 222 identifying that an address of a read request to the same storage as a previous read request is mapped to a region of the storage that is duplicated in a region of the other storage, the adaptive read circuitry 222 adjusts the address of the read request to be mapped to the region of the other storage that includes the duplicated data. As such, the adaptive read circuitry 222 translates read requests on-the-fly so that read requests to the same storage can be interleaved and served concurrently by accessing duplicated data from an alternate storage. In some examples, the adaptive read circuitry 222 is instantiated by programmable circuitry executing read request adapting instructions and/or configured to perform operations such as those represented by the flowchart(s) of FIGS. 8 and/or 9.

In some examples, the bus controller 104 includes means for adapting read requests. For example, the means for adapting read requests may be implemented by the adaptive read circuitry 222. In some examples, the adaptive read circuitry 222 may be instantiated by programmable circuitry such as the example programmable circuitry 1112 of FIG. 11. For instance, the adaptive read circuitry 222 may be instantiated by an example microprocessor executing machine-executable instructions such as those implemented by at least block 824 of FIG. 8 and/or at least blocks 902 and 904 of FIG. 9. In some examples, the adaptive read circuitry 222 may be instantiated by hardware logic circuitry, which may be implemented by an ASIC, XPU, or the FPGA circuitry 1200 of FIG. 12 configured and/or structured to perform operations corresponding to the machine-readable instructions. Additionally or alternatively, the adaptive read circuitry 222 may be instantiated by any other combination of hardware, software, and/or firmware. For example, the adaptive read circuitry 222 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the sequencing circuitry 224 includes a first input terminal, a second input terminal, a third input terminal, a first output terminal, and a second output terminal. In the example of FIG. 2, the first input terminal of the sequencing circuitry 224 is coupled to the random access read queue 232. The second input terminal of the sequencing circuitry 224 is coupled to the write queue 236. In the example of FIG. 2, the third input terminal of the sequencing circuitry 224 is coupled to the output terminal of the timing circuitry 210.

In the illustrated example of FIG. 2, the first output terminal of the sequencing circuitry 224 is coupled to the transaction generation circuitry 240. Additionally, the second output terminal of the sequencing circuitry 224 is coupled to the selection circuitry 242. In the example of FIG. 2, the sequencing circuitry 224 is implemented by programmable circuitry. For example, the sequencing circuitry 224 may be implemented by hardware circuitry, such as logic circuitry (e.g., sequential logic circuitry and/or combinational logic circuitry) implemented in silicon, and/or logic circuitry programmed by firmware. In additional or alternative examples, the sequencing circuitry 224 may be implemented by hardware, firmware, and/or software.

In the illustrated example of FIG. 2, the sequencing circuitry 224 sequences requests in the write queue 236 and/or the random access read queue 232. For example, the sequencing circuitry 224 sequences requests in the write queue 236 and/or the random access read queue 232 to be interleaved. In the example of FIG. 2, the sequencing circuitry 224 sequences a write request to be interleaved over a random access read request to reduce the number of clock cycles during which the shared bus 112 is idle. Additionally, the sequencing circuitry 224 sequences an incoming random access read request (e.g., XIP read request) to be interleaved over a current random access read request (e.g., XIP read request) to reduce the number of clock cycles during which the shared bus 112 is idle. In the example of FIG. 2, the sequencing circuitry 224 also maintains I/O states of I/O buffers of the bus controller 104.

In the illustrated example of FIG. 2, the sequencing circuitry 224 monitors for a first request and a second request where the second request is queued after the first request. Additionally, the sequencing circuitry 224 determines whether the first request is a first read request. When the sequencing circuitry 224 determines that the first request is a write-related request (e.g., a write request or a write completion polling request), the sequencing circuitry 224 determines whether a timeout period has expired. For example, the timeout period may be programmed by software (e.g., software executing on the one or more CPUs 106 of FIG. 1). When the timeout period has expired, the sequencing circuitry 224 forwards the write-related request to be issued as a transaction to the first storage 108 or the second storage 110.

In the illustrated example of FIG. 2, the sequencing circuitry 224 determines that the first request is a first read request, the sequencing circuitry 224 determines whether the second request is a second read request. When the sequencing circuitry 224 determines that the second request is not a second read request, the sequencing circuitry 224 determines whether the second request is a write-related request (e.g., a write request or a write completion polling request). When the sequencing circuitry 224 determines that the second request is a write-related request (e.g., the first request is a read request and the second request is a write-related request), the sequencing circuitry 224 sequences the write-related request to be partially or fully interleaved (e.g., to partially or fully overlap) with a wait interval of the read request.

In the illustrated example of FIG. 2, when the sequencing circuitry 224 determines that the second request is a second read request, the sequencing circuitry 224 determines whether a wait interval of the first read request is greater than the sum of a read interval of a previous read request and a command/address (C/A) interval of the second read request. In other words, the sequencing circuitry 224 determines whether the wait interval of the first read request is long enough for (a) the read interval of a previous read request and (b) the C/A interval of the second read request to be interleaved beneath the wait interval of the first read request. When the condition is satisfied, the sequencing circuitry 224 can initiate continuous pipelining.

For example, when the sequencing circuitry 224 determines that the wait interval of the first read request is greater than the sum of the read interval of a previous read request and the C/A interval of the second read request, the sequencing circuitry 224 sequences a wait interval of the current read request to be interleaved (e.g., to overlap) with a C/A interval of the next read request and read interval of the previous read request. The sequencing circuitry 224 can continue continuous pipelining of read requests until a wait interval of a current read request is not long enough for (a) a read interval of a previous read request and (b) a C/A interval of a next read request (queued after the current read request) to be interleaved beneath the wait interval of the current read request.

In the illustrated example of FIG. 2, when the sequencing circuitry 224 determines that the wait interval of the first read request is not greater than the sum of the read interval of a previous read request and the C/A interval of the second read request, the sequencing circuitry 224 determines whether a wait interval of the second read request is greater than a read interval of the first read request. In other words, the sequencing circuitry 224 determines whether the wait interval of the second read request is long enough for the read interval of the first read request to be interleaved beneath the wait interval of the second read request. When the condition is satisfied, the sequencing circuitry 224 can initiate dual issue pipelining of the first read request and the second read request.

For example, when the sequencing circuitry 224 determines that the wait interval of the second read request is greater than the read interval of the first read request, the sequencing circuitry 224 sequences a wait interval of the second read request to be interleaved (e.g., to overlap) with a read interval of the first read request. Otherwise, when the sequencing circuitry 224 determines that the wait interval of the second read request is not greater than the read interval of the first read request, the sequencing circuitry 224 forwards the first read request to be issued as a transaction to the first storage 108 or the second storage 110. In some examples, the sequencing circuitry 224 is instantiated by programmable circuitry executing sequencing instructions and/or configured to perform operations such as those represented by the flowchart(s) of FIGS. 8 and/or 10.

In some examples, the bus controller 104 includes means for sequencing. For example, the means for sequencing may be implemented by the sequencing circuitry 224. In some examples, the sequencing circuitry 224 may be instantiated by programmable circuitry such as the example programmable circuitry 1112 of FIG. 11. For instance, the sequencing circuitry 224 may be instantiated by an example microprocessor executing machine-executable instructions such as those implemented by at least blocks 826, 828, and 830 of FIG. 8 and/or at least blocks 1002, 1004, 1006, 1008, 1010, 1012, 1014, 1016, 1018, 1020, 1022, 1024, 1026, and 1028 of FIG. 10. In some examples, the sequencing circuitry 224 may be instantiated by hardware logic circuitry, which may be implemented by an ASIC, XPU, or the FPGA circuitry 1200 of FIG. 12 configured and/or structured to perform operations corresponding to the machine-readable instructions. Additionally or alternatively, the sequencing circuitry 224 may be instantiated by any other combination of hardware, software, and/or firmware. For example, the sequencing circuitry 224 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the prioritization circuitry 226 includes a first input terminal, a second input terminal, a third input terminal, a first output terminal, one or more second output terminals, a third output terminal, and a fourth output terminal. In the example of FIG. 2, the first input terminal of the prioritization circuitry 226 is coupled to the passthrough gate circuitry 238. Additionally, the second input terminal and the third input terminal of the prioritization circuitry 226 are coupled to the first output terminal of the sequencing circuitry 224. In the example of FIG. 2, the first output terminal of the prioritization circuitry 226 is coupled to the second input terminal of the transaction matching circuitry 216.

In the illustrated example of FIG. 2, the one or more second output terminals of the prioritization circuitry 226 are coupled to the first storage 108 and the second storage 110 (via the shared bus 112). Additionally, the third output terminal of the prioritization circuitry 226 is coupled to the first storage 108. In the example of FIG. 2, the fourth output terminal of the prioritization circuitry 226 is coupled to the second storage 110. In the example of FIG. 2, the prioritization circuitry 226 is implemented by programmable circuitry. For example, the prioritization circuitry 226 may be implemented by hardware circuitry such as logic circuitry (e.g., sequential logic circuitry and/or combinational logic circuitry) implemented in silicon. In additional or alternative examples, the prioritization circuitry 226 may be implemented by hardware, firmware, and/or software.

In the illustrated example of FIG. 2, the prioritization circuitry 226 generates one or more transactions and corresponding select signals to access the first storage 108 and the second storage 110. For example, the prioritization circuitry 226 generates one or more transactions and corresponding select signals to access the first storage 108 and the second storage 110 concurrently. In some examples, the prioritization circuitry 226 is instantiated by programmable circuitry executing prioritization instructions and/or configured to perform operations such as those represented by the flowchart(s) of FIG. 8.

In some examples, the bus controller 104 includes means for prioritizing. For example, the means for prioritizing may be implemented by the prioritization circuitry 226. In some examples, the prioritization circuitry 226 may be instantiated by programmable circuitry such as the example programmable circuitry 1112 of FIG. 11. For instance, the prioritization circuitry 226 may be instantiated by an example microprocessor executing machine-executable instructions such as those implemented by at least blocks 836 and 838 of FIG. 8. In some examples, the prioritization circuitry 226 may be instantiated by hardware logic circuitry, which may be implemented by an ASIC, XPU, or the FPGA circuitry 1200 of FIG. 12 configured and/or structured to perform operations corresponding to the machine-readable instructions. Additionally or alternatively, the prioritization circuitry 226 may be instantiated by any other combination of hardware, software, and/or firmware. For example, the prioritization circuitry 226 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

As described above, the request scheduling circuitry 218 includes the example sorting circuitry 228, the example non-random access read queue 230, the example random access read queue 232, the example dividing circuitry 234, the example write queue 236, and the example passthrough gate circuitry 238. In the example of FIG. 2, the sorting circuitry 228 includes an input terminal, a first output terminal, and a second output terminal. The input terminal of the sorting circuitry 228 is coupled to the output terminal of the read request queue 204.

In the illustrated example of FIG. 2, the first output terminal of the sorting circuitry 228 is coupled to the non-random access read queue 230. Additionally, the second output terminal of the sorting circuitry 228 is coupled to the random access read queue 232. In the example of FIG. 2, the sorting circuitry 228 is implemented by programmable circuitry. For example, the sorting circuitry 228 may be implemented by hardware circuitry, such as logic circuitry (e.g., sequential logic circuitry and/or combinational logic circuitry) implemented in silicon, and/or logic circuitry programmed by firmware. In additional or alternative examples, the sorting circuitry 228 may be implemented by hardware, firmware, and/or software.

In the illustrated example of FIG. 2, the sorting circuitry 228 determines whether read requests stored in the read request queue 204 are random access read requests or non-random access read requests. In the example of FIG. 2, the sorting circuitry 228 can determine whether a read request is a random access read request or a non-random access read request based on information included in the request. For example, a read request may include a flag to indicate whether the read request is a random access read request or a non-random access read request. Additionally or alternatively, the sorting circuitry 228 may compare the addresses identified in adjacent read requests in the read request queue 204 to determine whether the read requests are randomly accessing addresses in storage or if the read requests are accessing one or more contiguous regions in storage. In some examples, the sorting circuitry 228 compares the size of data requested in a read request to a threshold size to determine whether the read request is a non-random access read request or a random access read request. For example, read requests for large amounts of data (e.g., satisfying the threshold size) may be considered non-random access read requests.

In the illustrated example of FIG. 2, when the sorting circuitry 228 determines that an example read request is a non-random access read request, the sorting circuitry 228 adds the read request to the non-random access read queue 230. As such, non-random access read requests can be passed through to the passthrough gate circuitry 238 via the non-random access read queue 230. In some examples, non-random access read requests can be assigned a lower priority than random access read requests. In the example of FIG. 2, when the sorting circuitry 228 determines that an example read request is a random access read request, the sorting circuitry 228 adds the read request to the random access read queue 232. In some examples, the sorting circuitry 228 is instantiated by programmable circuitry executing sorting instructions and/or configured to perform operations such as those represented by the flowchart(s) of FIG. 8.

In some examples, the bus controller 104 includes means for sorting. For example, the means for sorting may be implemented by the sorting circuitry 228. In some examples, the sorting circuitry 228 may be instantiated by programmable circuitry such as the example programmable circuitry 1112 of FIG. 11. For instance, the sorting circuitry 228 may be instantiated by an example microprocessor executing machine-executable instructions such as those implemented by at least blocks 810, 812, and 814 of FIG. 8. In some examples, the sorting circuitry 228 may be instantiated by hardware logic circuitry, which may be implemented by an ASIC, XPU, or the FPGA circuitry 1200 of FIG. 12 configured and/or structured to perform operations corresponding to the machine-readable instructions. Additionally or alternatively, the sorting circuitry 228 may be instantiated by any other combination of hardware, software, and/or firmware. For example, the sorting circuitry 228 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the non-random access read queue 230 includes an input terminal and an output terminal. In the example of FIG. 2, the input terminal of the non-random access read queue 230 is coupled to the first output terminal of the sorting circuitry 228. Additionally, the output terminal of the non-random access read queue 230 is coupled to the passthrough gate circuitry 238. In the example of FIG. 2, the non-random access read queue 230 is implemented by volatile memory. For example, the non-random access read queue 230 is implemented by a FIFO queue in RAM. Additionally or alternatively, the non-random access read queue 230 may be implemented by any other type of data structure in memory such as a circular buffer in RAM. In the example of FIG. 2, the non-random access read queue 230 stores one or more non-random access read requests. For example, the non-random access read requests may be associated with reading an image from the first storage 108 and/or the second storage 110.

In the illustrated example of FIG. 2, the random access read queue 232 includes an input terminal, an output terminal, and a dual-purpose terminal. In the example of FIG. 2, the input terminal of the random access read queue 232 is coupled to the second output terminal of the sorting circuitry 228. Additionally, the output terminal of the random access read queue 232 is coupled to the sequencing circuitry 224. In the example of FIG. 2, the dual-purpose terminal of the random access read queue 232 is coupled to the adaptive read circuitry 222. In the example of FIG. 2, the random access read queue 232 is implemented by volatile memory. For example, the random access read queue 232 is implemented by a FIFO queue in RAM. Additionally or alternatively, the random access read queue 232 may be implemented by any other type of data structure in memory such as a circular buffer in RAM. In the example of FIG. 2, the random access read queue 232 stores one or more random access read requests. For example, the random access read requests may be associated with reading one or more instructions from the first storage 108 and/or the second storage 110.

In the illustrated example of FIG. 2, the dividing circuitry 234 includes an input terminal, a first output terminal, and a second output terminal. In the example of FIG. 2, the input terminal of the dividing circuitry 234 is coupled to the output terminal of the write request queue 206. Additionally, the first output terminal of the dividing circuitry 234 is coupled to the write queue 236. In the example of FIG. 2, the second output terminal of the dividing circuitry 234 is coupled to the input terminal of the write state machine circuitry 220.

In the illustrated example of FIG. 2, the dividing circuitry 234 is implemented by programmable circuitry. For example, the dividing circuitry 234 may be implemented by hardware circuitry, such as logic circuitry (e.g., sequential logic circuitry and/or combinational logic circuitry) implemented in silicon, and/or logic circuitry programmed by firmware. In additional or alternative examples, the dividing circuitry 234 may be implemented by hardware, firmware, and/or software. In the example of FIG. 2, the dividing circuitry 234 breaks down (e.g., divides) large writes into smaller writes (e.g., for interleaving with wait intervals of read requests). For example, the dividing circuitry 234 compares a size of data to be written for the write request to a threshold size. When the dividing circuitry 234 determines that the size of the data to be written for the write request satisfies the threshold size, the dividing circuitry 234 divides the write request into two or more write requests.

In the illustrated example of FIG. 2, when the dividing circuitry 234 divides a write request, the dividing circuitry 234 informs the write state machine circuitry 220 of the number of write requests into which the original write request was divided. After dividing a write request into two or more smaller write requests, the dividing circuitry 234 adds the two or more write requests to the write queue 236. In the example of FIG. 2, when the dividing circuitry 234 determines that the size of the data to be written for the write request does not satisfy the threshold size, the dividing circuitry 234 adds the write requests to the write queue 236 (e.g., without dividing the write request into smaller requests). In some examples, the dividing circuitry 234 may be configured to be enabled and/or disabled by software (e.g., the one or more CPUs 106 of FIG. 1). In some examples, the dividing circuitry 234 is instantiated by programmable circuitry executing dividing instructions and/or configured to perform operations such as those represented by the flowchart(s) of FIG. 8.

In some examples, the bus controller 104 includes means for dividing. For example, the means for dividing may be implemented by the dividing circuitry 234. In some examples, the dividing circuitry 234 may be instantiated by programmable circuitry such as the example programmable circuitry 1112 of FIG. 11. For instance, the dividing circuitry 234 may be instantiated by an example microprocessor executing machine-executable instructions such as those implemented by at least blocks 816, 818, and 820 of FIG. 8. In some examples, the dividing circuitry 234 may be instantiated by hardware logic circuitry, which may be implemented by an ASIC, XPU, or the FPGA circuitry 1200 of FIG. 12 configured and/or structured to perform operations corresponding to the machine-readable instructions. Additionally or alternatively, the dividing circuitry 234 may be instantiated by any other combination of hardware, software, and/or firmware. For example, the dividing circuitry 234 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the write queue 236 includes a first input terminal, a second input terminal, and an output terminal. In the example of FIG. 2, the first input terminal of the write queue 236 is coupled to the first output terminal of the dividing circuitry 234. The second input terminal of the write queue 236 is coupled to the output terminal of the write state machine circuitry 220. Additionally, the output terminal of the write queue 236 is coupled to the second input terminal of the sequencing circuitry 224. In the example of FIG. 2, the write queue 236 is implemented by volatile memory. For example, the write queue 236 is implemented by a FIFO queue in RAM. Additionally or alternatively, the write queue 236 may be implemented by any other type of data structure in memory such as a circular buffer in RAM. In the example of FIG. 2, the write queue 236 stores one or more write requests and/or one or more write completion polling requests.

In the illustrated example of FIG. 2, the passthrough gate circuitry 238 includes a first input terminal, a second input terminal, and an output terminal. In the example of FIG. 2, the first input terminal of the passthrough gate circuitry 238 is coupled to the one or more CPUs 106 of FIG. 1. Additionally, the second input terminal of the passthrough gate circuitry 238 is coupled to the output terminal of the non-random access read queue 230. In the example of FIG. 2, the output terminal of the passthrough gate circuitry 238 is coupled to the transaction generation circuitry 240.

In the illustrated example of FIG. 2, the passthrough gate circuitry 238 is implemented by programmable circuitry. For example, the passthrough gate circuitry 238 may be implemented by hardware circuitry, such as one or more switches. In the example of FIG. 2, the one or more switches may be transistors such as metal oxide semiconductor field effect transistors (MOSFET), bipolar junction transistors (BJT), junction gate field effect transistors (JFET), heterojunction bipolar transistors (HBT), etc. In some examples, the passthrough gate circuitry 238 may be implemented by hardware, firmware, and/or software. In the example of FIG. 2, the passthrough gate circuitry 238 determines whether the passthrough gate circuitry 238 is enabled. For example, the passthrough gate circuitry 238 may include control circuitry (e.g., implemented by one or more switches) that can determine whether the passthrough gate circuitry 238 is enabled. In the example of FIG. 2, a logic high value (e.g., a "1," a 5 volt (V) signal, etc.) indicates that the passthrough gate circuitry 238 is to be enabled whereas a logic low value (e.g., a "0," a 0 V signal, etc.) indicates that the passthrough gate circuitry 238 is to be disabled.

In the illustrated example of FIG. 2, when the passthrough gate circuitry 238 is enabled, the passthrough gate circuitry 238 forwards non-random access read requests from the non-random access read queue 230 to the transaction generation circuitry 240. For example, when the passthrough gate circuitry 238 is enabled (e.g., based on a signal indicating to bypass interleaving), the passthrough gate circuitry 238 dequeues a non-random access read request from the non-random access read queue 230 to the transaction generation circuitry 240. When the passthrough gate circuitry 238 is disabled, the passthrough gate circuitry 238 does not forward non-random access read requests from the non-random access read queue 230 to the transaction generation circuitry 240. For example, when the passthrough gate circuitry 238 is disabled (e.g., based on a signal indicating not to bypass interleaving), the passthrough gate circuitry 238 prevents dequeuing of a non-random access read request from the non-random access read queue 230 to the transaction generation circuitry 240. In some examples, the passthrough gate circuitry 238 is instantiated by programmable circuitry executing passthrough instructions and/or configured to perform operations such as those represented by the flowchart(s) of FIG. 8.

In some examples, the bus controller 104 includes means for passing. For example, the means for passing may be implemented by the passthrough gate circuitry 238. In some examples, the passthrough gate circuitry 238 may be instantiated by programmable circuitry such as the example programmable circuitry 1112 of FIG. 11. For instance, the passthrough gate circuitry 238 may be instantiated by an example microprocessor executing machine-executable instructions such as those implemented by at least block 822 of FIG. 8. In some examples, the passthrough gate circuitry 238 may be instantiated by hardware logic circuitry, which may be implemented by an ASIC, XPU, or the FPGA circuitry 1200 of FIG. 12 configured and/or structured to perform operations corresponding to the machine-readable instructions. Additionally or alternatively, the passthrough gate circuitry 238 may be instantiated by any other combination of hardware, software, and/or firmware. For example, the passthrough gate circuitry 238 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

As described above, the example prioritization circuitry 226 includes the example transaction generation circuitry 240 and the example selection circuitry 242. In the example of FIG. 2, the transaction generation circuitry 240 includes a first input terminal, a second input terminal, a first output terminal, and one or more second output terminals. In the example of FIG. 2, the first input terminal of the transaction generation circuitry 240 is coupled to the output terminal of the passthrough gate circuitry 238. Additionally, the second input terminal of the transaction generation circuitry 240 is coupled to the first output terminal of the sequencing circuitry 224.

In the illustrated example of FIG. 2, the first output terminal of the transaction generation circuitry 240 is coupled to the second input terminal of the transaction matching circuitry 216. Additionally, the one or more second output terminals of the transaction generation circuitry 240 are coupled to the first storage 108 and the second storage 110 (via the shared bus 112). In the example of FIG. 2, the transaction generation circuitry 240 is implemented by programmable circuitry. For example, the transaction generation circuitry 240 may be implemented by hardware circuitry such as logic circuitry (e.g., sequential logic circuitry and/or combinational logic circuitry) implemented in silicon. In additional or alternative examples, the transaction generation circuitry 240 may be implemented by hardware, firmware, and/or software.

In the illustrated example of FIG. 2, the transaction generation circuitry 240 generates one or more transactions to access the first storage 108 and/or the second storage 110 based the requests in the non-random access read queue 230 (assuming the passthrough gate circuitry 238 is enabled), the random access read queue 232, and/or the write queue 236. For example, the one or more transactions are based on one or more sequence commands transmitted to the transaction generation circuitry 240 by the sequencing circuitry 224. As described above, a transaction refers to one or more signals that are communicated to storage to facilitate a request to access the storage. For example, a read transaction includes a one or more first signals that the bus controller 104 utilizes to communicate a read command to storage and to identify an address from which data is to be read. Additionally, for example, a read transaction is associated with a second signal to communicate the data to and/or from the storage. In the example of FIG. 2, to generate a transaction, the transaction generation circuitry 240 generates one or more signals to communicate a command and address to one or more of the first storage 108 or the second storage 110. Additionally, generating a transaction includes generating a transaction token to identify the transaction to one or more of the first storage 108 or the second storage 110. Example transaction tokens may be included with one or more signals communicated to storage. After generating a transaction, the transaction generation circuitry 240 forwards a transaction token for the transaction to the transaction matching circuitry 216. Example transactions vary based on whether the transaction is based on a read request, a write request, or a write completion polling request. For example, a read transaction is associated with a command interval during which the transaction generation circuitry 240 communicates a read command to a storage, an address interval during which the transaction generation circuitry 240 communicates an address from which data is to be read to the storage, a wait interval during which the storage accesses data from the address, and a read interval during which the storage communicates the data to the data sampling circuitry 212.

Additionally, for example, a write transaction is associated with a command interval during which the transaction generation circuitry 240 communicates a write command to a storage, an address interval during which the transaction generation circuitry 240 communicates an address to which data is to be written to the storage, and a write interval during which the transaction generation circuitry 240 communicates the data to be written to the storage. An example write completion polling transaction is associated with a command interval during which the transaction generation circuitry 240 communicates a write completion polling command to a storage, an address interval during which the transaction generation circuitry 240 communicates an address to be polled in the storage, and a write polling interval during which the data sampling circuitry 212 reads a status register associated with the address in the storage. In some examples, the transaction generation circuitry 240 is instantiated by programmable circuitry executing transaction generating instructions and/or configured to perform operations such as those represented by the flowchart(s) of FIG. 8.

In some examples, the bus controller 104 includes means for generating transactions. For example, the means for generating transactions may be implemented by the transaction generation circuitry 240. In some examples, the transaction generation circuitry 240 may be instantiated by programmable circuitry such as the example programmable circuitry 1112 of FIG. 11. For instance, the transaction generation circuitry 240 may be instantiated by an example microprocessor executing machine-executable instructions such as those implemented by at least block 836 of FIG. 8. In some examples, the transaction generation circuitry 240 may be instantiated by hardware logic circuitry, which may be implemented by an ASIC, XPU, or the FPGA circuitry 1200 of FIG. 12 configured and/or structured to perform operations corresponding to the machine-readable instructions. Additionally or alternatively, the transaction generation circuitry 240 may be instantiated by any other combination of hardware, software, and/or firmware. For example, the transaction generation circuitry 240 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

In the illustrated example of FIG. 2, the selection circuitry 242 includes an input terminal, a first output terminal, and a second output terminal. In the example of FIG. 2, the input terminal of the selection circuitry 242 is coupled to the second output terminal of the sequencing circuitry 224. Additionally, the first output terminal of the selection circuitry 242 is coupled to the first storage 108. The second output terminal of the selection circuitry 242 is coupled to the second storage 110. In the example of FIG. 2, the selection circuitry 242 is implemented by programmable circuitry. For example, the selection circuitry 242 may be implemented by hardware circuitry such as logic circuitry (e.g., sequential logic circuitry and/or combinational logic circuitry) implemented in silicon. In additional or alternative examples, the selection circuitry 242 may be implemented by hardware, firmware, and/or software.

In the illustrated example of FIG. 2, the selection circuitry 242 generates one or more select signals corresponding to the one or more transactions generated by the transaction generation circuitry 240. For example, the selection circuitry 242 generates a first select signal at the first output terminal of the selection circuitry 242 to control when the first storage 108 is selected. In this manner, the first output terminal of the selection circuitry 242 can be considered a first select terminal of the selection circuitry 242. Additionally, for example, the selection circuitry 242 generates a second select signal at the second output terminal of the selection circuitry 242 to control when the second storage 110 is selected. In this manner, the second output terminal of the selection circuitry 242 can be considered a second select terminal of the selection circuitry 242.

In the illustrated example of FIG. 2, the selection circuitry 242 precisely asserts and/or deasserts select signals for multiple storages (e.g., the first storage 108 and the second storage 110) based on the timing of the one or more transactions. Additionally, for concurrent and/or otherwise interleaved transactions on the shared bus 112, the selection circuitry 242 simultaneously assert select signals for the first storage 108 and the second storage 110 during wait intervals. In some examples, the selection circuitry 242 is instantiated by programmable circuitry executing selecting instructions and/or configured to perform operations such as those represented by the flowchart(s) of FIG. 8.

In some examples, the bus controller 104 includes means for selecting. For example, the means for selecting may be implemented by the selection circuitry 242. In some examples, the selection circuitry 242 may be instantiated by programmable circuitry such as the example programmable circuitry 1112 of FIG. 11. For instance, the selection circuitry 242 may be instantiated by an example microprocessor executing machine-executable instructions such as those implemented by at least block 838 of FIG. 8. In some examples, the selection circuitry 242 may be instantiated by hardware logic circuitry, which may be implemented by an ASIC, XPU, or the FPGA circuitry 1200 of FIG. 12 configured and/or structured to perform operations corresponding to the machine-readable instructions. Additionally or alternatively, the selection circuitry 242 may be instantiated by any other combination of hardware, software, and/or firmware. For example, the selection circuitry 242 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine-readable instructions and/or to perform some or all of the operations corresponding to the machine-readable instructions without executing software or firmware, but other structures are likewise appropriate.

While an example manner of implementing the bus controller 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example interface circuitry 202, the example read request queue 204, the example write request queue 206, the example interleaving circuitry 208, the example timing circuitry 210, the example data sampling circuitry 212, the example receive queue 214, the example transaction matching circuitry 216, and/or, more generally, the example bus controller 104 of FIG. 2, and/or the example request scheduling circuitry 218, the example write state machine circuitry 220, the example adaptive read circuitry 222, the example sequencing circuitry 224, the example prioritization circuitry 226, and/or, more generally, the example interleaving circuitry 208 of FIG. 2, and/or the example sorting circuitry 228, the example non-random access read queue 230, the example random access read queue 232, the example dividing circuitry 234, the example write queue 236, the example passthrough gate circuitry 238, and/or, more generally, the request scheduling circuitry 218 of FIG. 2, and/or the example transaction generation circuitry 240, the example selection circuitry 242, and/or, more generally, the example prioritization circuitry 226 of FIG. 2, may be implemented by hardware alone or by hardware in combination with software and/or firmware. Thus, for example, any of the example interface circuitry 202, the example read request queue 204, the example write request queue 206, the example interleaving circuitry 208, the example timing circuitry 210, the example data sampling circuitry 212, the example receive queue 214, the example transaction matching circuitry 216, and/or, more generally, the example bus controller 104 of FIG. 2, and/or the example request scheduling circuitry 218, the example write state machine circuitry 220, the example adaptive read circuitry 222, the example sequencing circuitry 224, the example prioritization circuitry 226, and/or, more generally, the example interleaving circuitry 208 of FIG. 2, and/or the example sorting circuitry 228, the example non-random access read queue 230, the example random access read queue 232, the example dividing circuitry 234, the example write queue 236, the example passthrough gate circuitry 238, and/or, more generally, the request scheduling circuitry 218 of FIG. 2, and/or the example transaction generation circuitry 240, the example selection circuitry 242, and/or, more generally, the example prioritization circuitry 226 of FIG. 2, could be implemented by programmable circuitry in combination with machine-readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example bus controller 104 of FIG. 2 may include one or more elements, processes, and/or devices in addition to, or instead of, those illustrated in FIG. 2, and/or may include more than one of any or all of the illustrated elements, processes, and devices.

Figure 3:
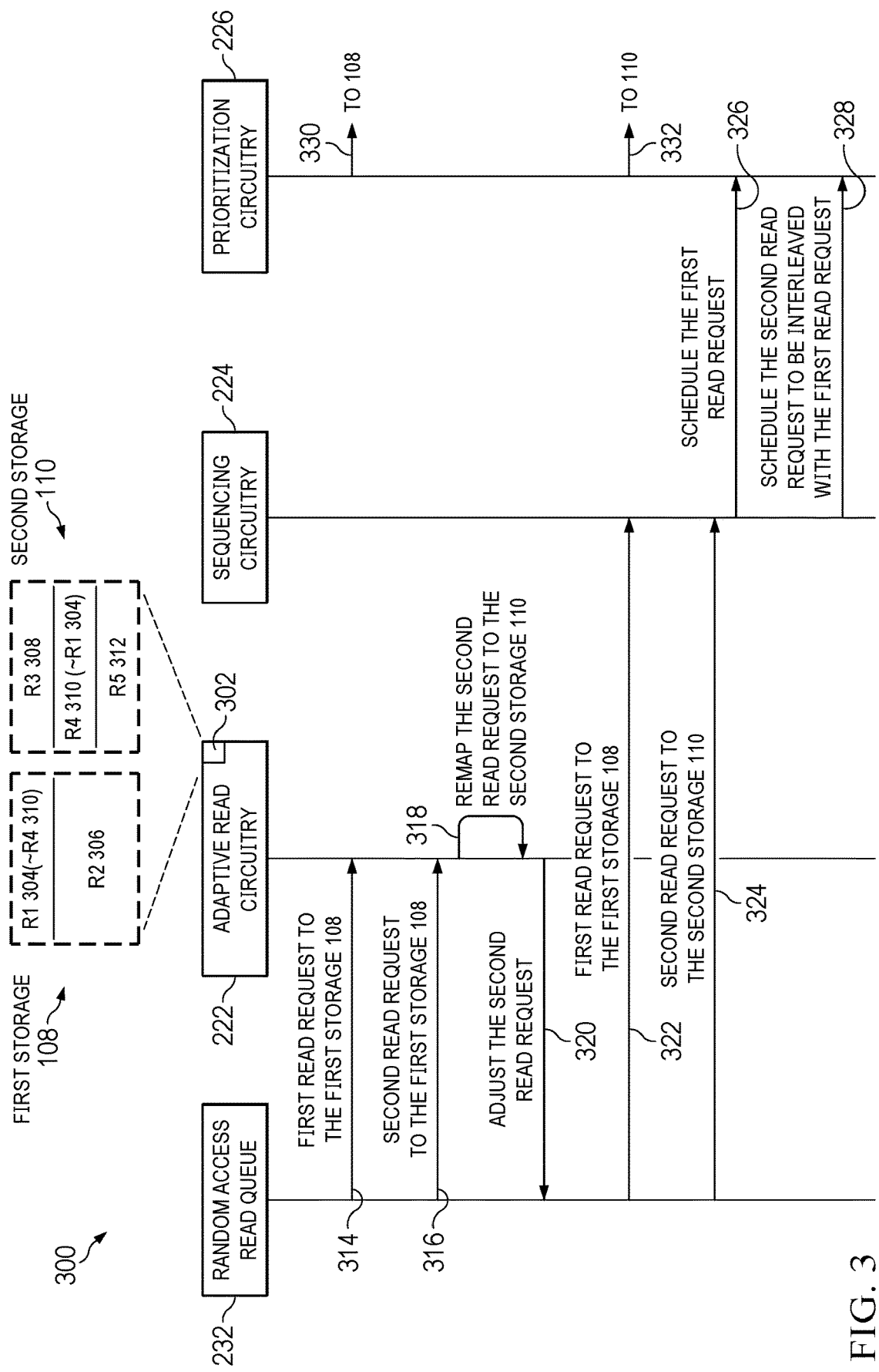
FIG. 3 is a sequence diagram illustrating example operations for adjusting one or more read requests with the adaptive read circuitry of FIG. 2.

FIG. 3 is a sequence diagram 300 illustrating example operations for adjusting one or more read requests with the adaptive read circuitry 222 of FIG. 2. In the example of FIG. 3, the adaptive read circuitry 222 includes an example data structure 302. The example data structure 302 indicates a mapping of data in the first storage 108 and the second storage 110. For example, the data structure 302 indicates that the first storage 108 includes an example first region 304 (identified as "R1") and an example second region 306 (identified as "R2"). Additionally, for example, the data structure 302 indicates that the second storage 110 includes an example third region 308 (identified as "R3"), an example fourth region 310 (identified as "R4"), and an example fifth region 312 (identified as "R5"). The example data structure 302 also indicates that the data stored in the first region 304 of the first storage 108 is duplicated in the fourth region 310 of the second storage 110.

In the illustrated example of FIG. 3, at an example first operation 314, the adaptive read circuitry 222 accesses a first read request from the random access read queue 232. In the example of FIG. 3, the first read request is a read request to the first storage 108. At an example second operation 316, the adaptive read circuitry 222 accesses a second read request from the random access read queue 232. In the example of FIG. 3, the second read request is a read request to the first storage 108.

In the illustrated example of FIG. 3, at an example third operation 318, the adaptive read circuitry 222 analyzes the first read request and the second read request. For example, the adaptive read circuitry 222 determines that the first read request and the second read request are read requests to the first storage 108. Based on identifying that the first read request and the second read request are both read requests to the first storage 108, the adaptive read circuitry 222 determines whether the first read request or the second read request is requesting data from a first region of the first storage 108 that is duplicated in a second region of the second storage 110 (e.g., the first region 304 or the fourth region 310) and could be satisfied using the second storage 110 instead of the first storage 108. For example, when the first read request or the second read request is requesting data from the first region 304 of the first storage 108, the adaptive read circuitry 222 determines that the second read request is requesting data from a first region of the first storage 108 (e.g., the first region 304) that is duplicated in a second region of the second storage 110 (e.g., the fourth region 310).

In the illustrated example of FIG. 3, based on determining that the second read request is requesting data from a first region of the first storage 108 that is duplicated in a second region of the second storage 110, the adaptive read circuitry 222 remaps the second read request to the second storage 110. At an example fourth operation 320, the adaptive read circuitry 222 adjusts the second read request in the random access read queue 232 to be addressed to the second region in the second storage 110. For example, the adaptive read circuitry 222 translates the address of the second request to the initial address of the fourth region 310 plus the offset of the address of the second request from an initial address in the first region 304.

In the illustrated example of FIG. 3, at an example fifth operation 322, the random access read queue 232 forwards the first read request to the sequencing circuitry 224. In the example of FIG. 3, the first read request is a read request to the first storage 108. At an example sixth operation 324, the random access read queue 232 forwards the second read request to the sequencing circuitry 224. In the example of FIG. 3, at the sixth operation 324, the second read request is a read request to the second storage 110. At an example seventh operation 326, the sequencing circuitry 224 schedules the first read request.

In the illustrated example of FIG. 3, at an example eighth operation 328, the sequencing circuitry 224 schedules the second read request to be interleaved (e.g., to overlap) with the first request. For example, because the adaptive read circuitry 222 has remapped the second read request from the first storage 108 to the second storage 110, the sequencing circuitry 224 can schedule the first read request and the second read request to be interleaved. In the example of FIG. 3, at an example ninth operation 330, the prioritization circuitry 226 generates a first transaction to access the first storage 108 based on the first read request. Additionally, at an example tenth operation 332, the prioritization circuitry 226 generates a second transaction to access the second storage 110 based on the second read request.

Figure 4:
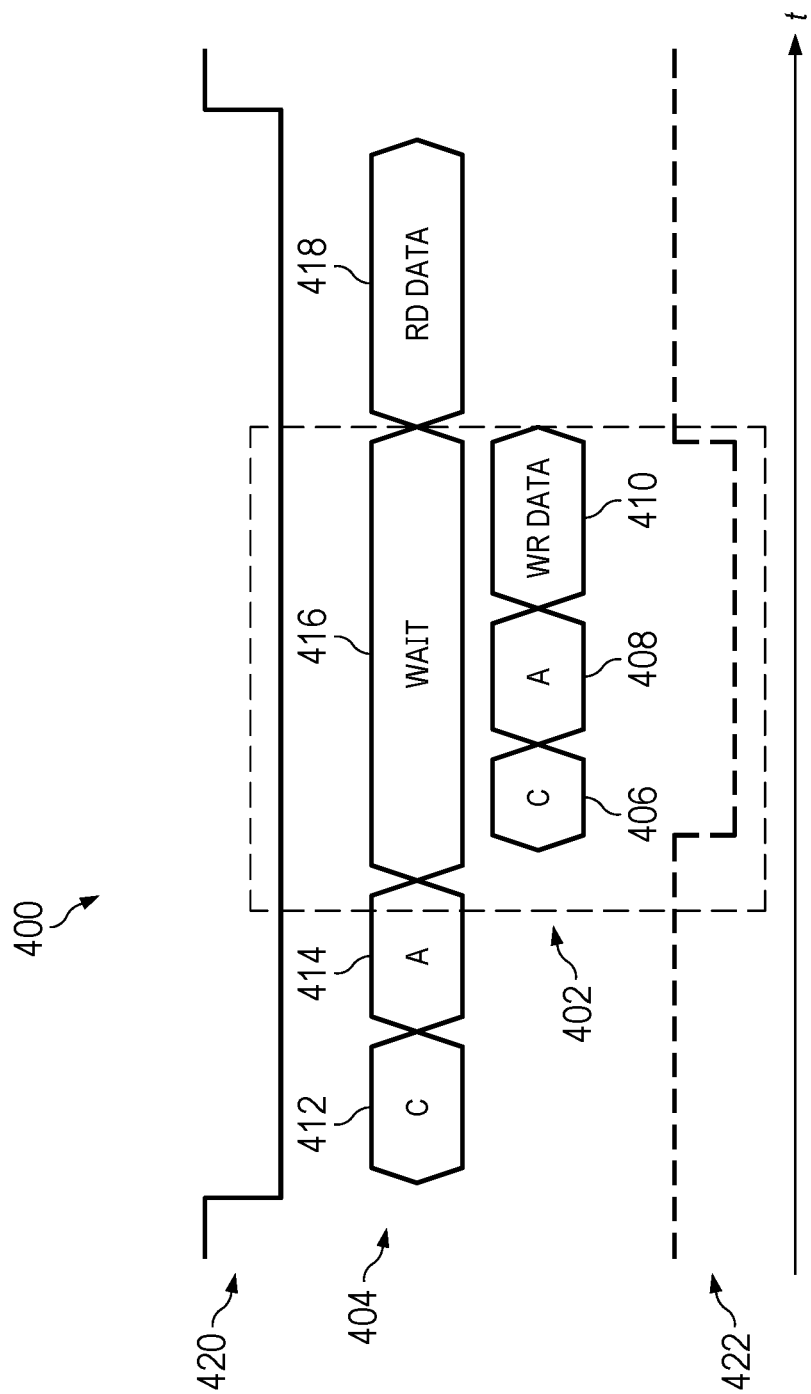
FIG. 4 is a timing diagram illustrating an example write request interleaved with an example read request.

FIG. 4 is a timing diagram 400 illustrating an example write transaction 402 interleaved with an example read transaction 404. In the example of FIG. 4, the write transaction 402 is addressed to the second storage 110 and the read transaction 404 is addressed to the first storage 108. Additionally, in the example of FIG. 4, the write transaction 402 is associated with an example first command interval 406, an example first address interval 408, and an example write interval 410. In the example of FIG. 4, the write transaction 402 is associated with writing 32 bytes of data to storage. In the example of FIG. 4, the read transaction 404 is associated with an example second command interval 412, an example second address interval 414, an example wait interval 416, and an example read interval 418.

In the illustrated example of FIG. 4, each of the first command interval 406 and the second command interval 412 is associated with one clock cycle. Additionally, each of the first address interval 408 and the second address interval 414 is associated with two clock cycles. In the example of FIG. 4, the write interval 410 is associated with 16 clock cycles. Additionally, the wait interval 416 is associated with 20 clock cycles. The example read interval 418 is associated with 16 clock cycles. As illustrated in FIG. 4, because the wait interval 416 of the read transaction 404 is greater than the sum of the first command interval 406, the first address interval 408, and the write interval 410 (e.g., 20>1+2+16), the sequencing circuitry 224 sequences the write transaction 402 to be partially or fully interleaved (e.g., to partially or fully overlap) with the wait interval 416 of the read transaction 404. As such, the write transaction 402 can be considered a "0 cycle" write operation.

In the illustrated example of FIG. 4, the selection circuitry 242 cause transmission of an example first select signal 420 to the first storage 108 to facilitate the read transaction 404. As illustrated in FIG. 4, the first select signal 420 remains asserted during the read transaction 404, including the portion of the read transaction 404 (e.g., the wait interval 416) that is interleaved with the write transaction 402. Additionally, in the example of FIG. 4, the selection circuitry 242 causes transmission of an example second select signal 422 to the second storage 110 to facilitate the write transaction 402. As illustrated in FIG. 4, the second select signal 422 remains asserted during the write transaction 402. In the example of FIG. 4, a high impedance (Hi-Z) property of an interface of the first storage 108 causes the first storage 108 to disregard activities on the shared bus 112 during the wait interval 416.

Figure 5:
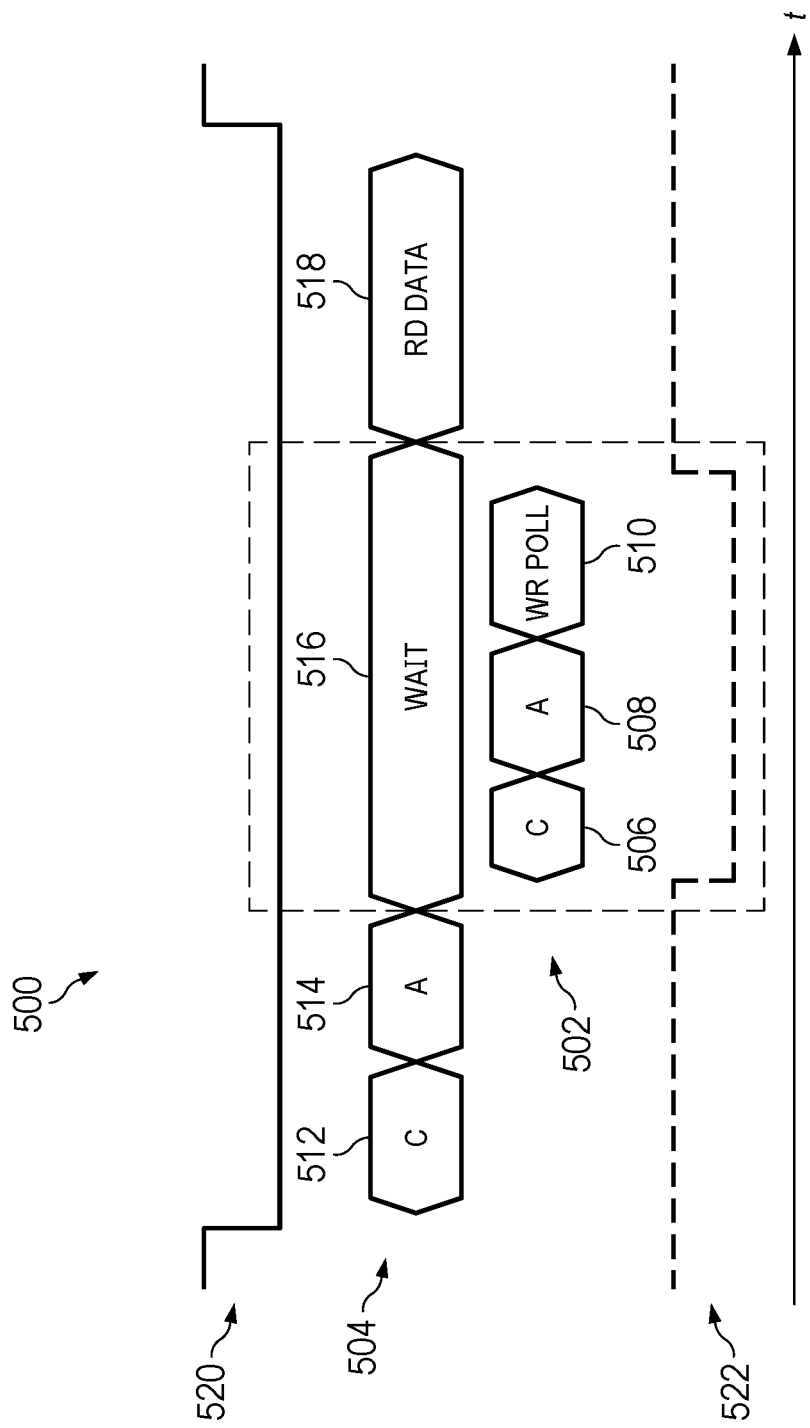
FIG. 5 is a timing diagram illustrating an example write completion polling request interleaved with an example read request.

FIG. 5 is a timing diagram 500 illustrating an example write completion polling transaction 502 interleaved with an example read transaction 504. In the example of FIG. 5, the write completion polling transaction 502 is addressed to the second storage 110 and the read transaction 504 is addressed to the first storage 108. Additionally, in the example of FIG. 5, the write completion polling transaction 502 is associated with an example first command interval 506, an example first address interval 508, and an example write polling interval 510. In the example of FIG. 5, the read transaction 504 is associated with an example second command interval 512, an example second address interval 514, an example wait interval 516, and an example read interval 518.

In the illustrated example of FIG. 5, each of the first command interval 506 and the second command interval 512 is associated with one clock cycle. Additionally, each of the first address interval 508 and the second address interval 514 is associated with two clock cycles. In the example of FIG. 5, the write polling interval 510 is associated with two clock cycles. Additionally, the wait interval 516 is associated with 20 clock cycles. The example read interval 518 is associated with 16 clock cycles. As illustrated in FIG. 5, because the wait interval 516 of the read transaction 504 is greater than the sum of the first command interval 506, the first address interval 508, and the write polling interval 510 (e.g., 20>1+2+2), the sequencing circuitry 224 sequences the write completion polling transaction 502 to be partially or fully interleaved (e.g., to partially or fully overlap) with the wait interval 516 of the read transaction 504. As such, the write completion polling transaction 502 can be considered a "0 cycle" write polling.

In the illustrated example of FIG. 5, the selection circuitry 242 cause transmission of an example first select signal 520 to the first storage 108 to facilitate the read transaction 504. As illustrated in FIG. 5, the first select signal 520 remains asserted during the read transaction 504, including the portion of the read transaction 504 (e.g., the wait interval 516) that is interleaved with the write completion polling transaction 502. Additionally, in the example of FIG. 5, the selection circuitry 242 causes transmission of an example second select signal 522 to the second storage 110 to facilitate the write completion polling transaction 502. As illustrated in FIG. 5, the second select signal 522 remains asserted during the write completion polling transaction 502. In the example of FIG. 5, a Hi-Z property of an interface of the first storage 108 causes the first storage 108 to disregard activities on the shared bus 112 during the wait interval 516.

Figure 6:
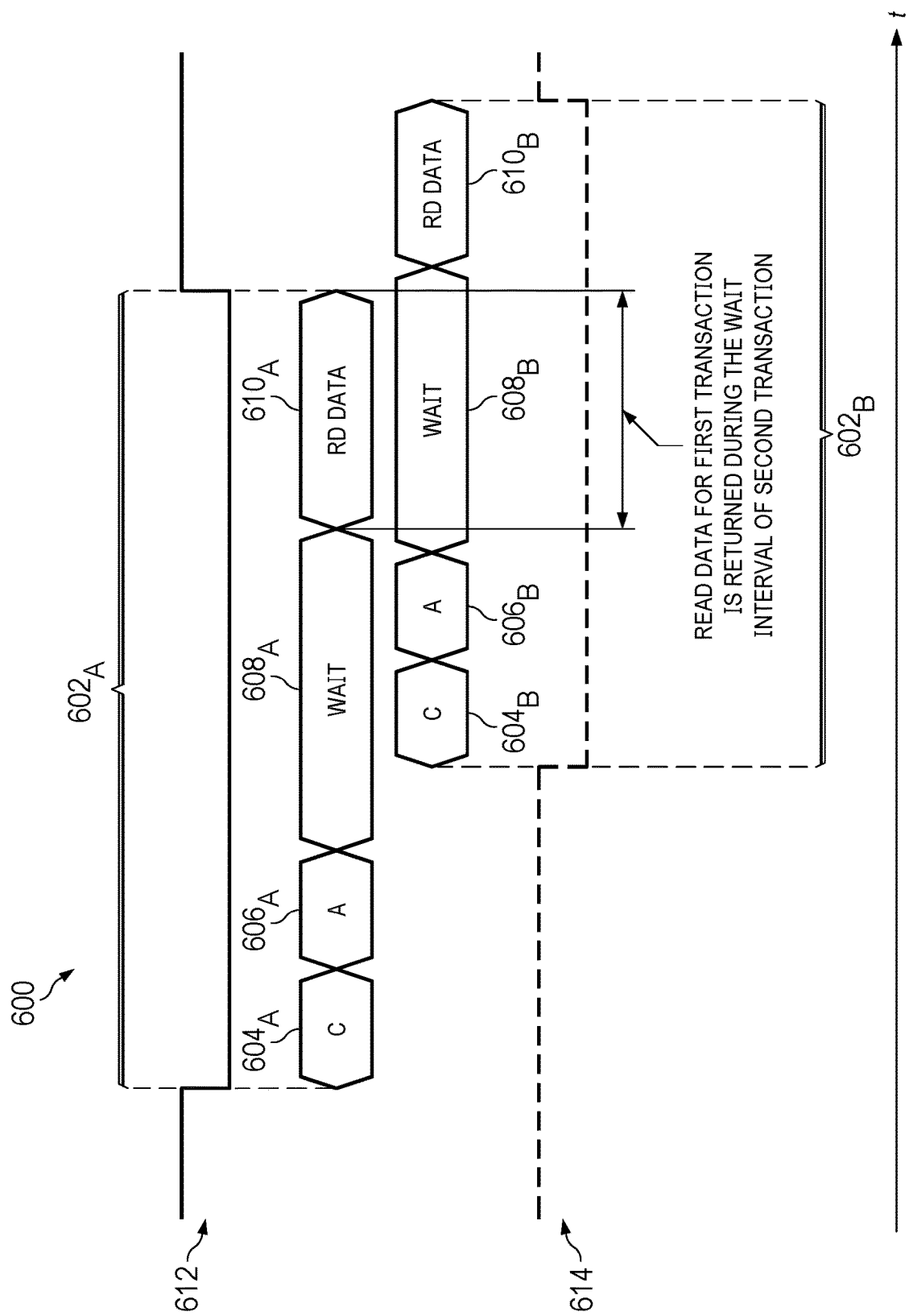
FIG. 6 is a timing diagram illustrating an example first read request interleaved with an example second read request.

FIG. 6 is a timing diagram 600 illustrating an example first read transaction $602_A$ interleaved with an example second read transaction $602_B$. In the example of FIG. 6, the first read transaction $602_A$ is addressed to the first storage 108 and the second read transaction $602_B$ is addressed to the second storage 110. Additionally, in the example of FIG. 6, each of the first read transaction $602_A$ and the second read transaction $602_B$ is associated with an example command interval, an example address interval, an example wait interval, and an example read interval. For example, the first read transaction $602_A$ is associated with an example first command interval $604_A$, an example first address interval $606_A$, an example first wait interval $608_A$, and an example first read interval $610_A$. Additionally, the second read transaction $602_B$ is associated with an example second command interval $604_B$, an example second address interval $606_B$, an example second wait interval $608_B$, and an example second read interval $610_B$.

In the illustrated example of FIG. 6, each of the first read transaction $602_A$ and the second read transaction $602_B$ facilitates an XIP read request (e.g., execute in place read request). Additionally, in the example of FIG. 6, each of the first command interval $604_A$ and the second command interval $604_B$ is associated with one clock cycle. Additionally, each of the first address interval $606_A$ and the second address interval $606_B$ is associated with two clock cycles. In the example of FIG. 6, each of the first wait interval $608_A$ and the second wait interval $608_B$ is associated with 20 clock cycles. Additionally, each of the first read interval $610_A$ and the second read interval $610_B$ is associated with 16 clock cycles. As illustrated in FIG. 6, because the second wait interval $608_B$ of the second read transaction $602_B$ is greater than the first read interval $610_A$ of the first read transaction $602_A$ (e.g., 20>16), the sequencing circuitry 224 sequences the second wait interval $608_B$ of the second read transaction $602_B$ to be interleaved (e.g., to overlap) with the first read interval $610_A$ of the first read transaction $602_A$.

FIG. 6 illustrates an example of dual issue pipelining where the first read transaction $602_A$ and the second read transaction $602_B$ are pipelined to read data from two storages (e.g., the first storage 108 and the second storage 110). As such, the dual issue pipelining illustrated in FIG. 6 improves utilization of the shared bus 112. For example, the selection circuitry 242 cause transmission of an example first select signal 612 to the first storage 108 to facilitate the first read transaction $602_A$. As illustrated in FIG. 6, the first select signal 612 remains asserted during the first read transaction $602_A$, including the portion of the first read transaction $602_A$ (e.g., some of the first wait interval $608_A$ and the first read interval $610_A$) that is interleaved with the second read transaction $602_B$. In the example of FIG. 6, a Hi-Z property of an interface of the first storage 108 causes the first storage 108 to disregard activities on the shared bus 112 during the first wait interval $608_A$.

In the illustrated example of FIG. 6, the selection circuitry 242 causes transmission of an example second select signal 614 to the second storage 110 to facilitate the second read transaction $602_B$. As illustrated in FIG. 6, the second select signal 614 remains asserted during the second read transaction $602_B$, including the portion of the second read transaction $602_B$ (e.g., the second command interval $604_B$, the second address interval $606_B$, and some of the second wait interval $608_B$) that is interleaved with the first read transaction $602_A$. As such, the data requested via the first read transaction $602_A$ is returned from the first storage 108 during the second wait interval $608_B$ of the second read transaction $602_B$. In the example of FIG. 6, a Hi-Z property of an interface of the second storage 110 causes the second storage 110 to disregard activities on the shared bus 112 during the second wait interval $608_B$.

Figure 7:
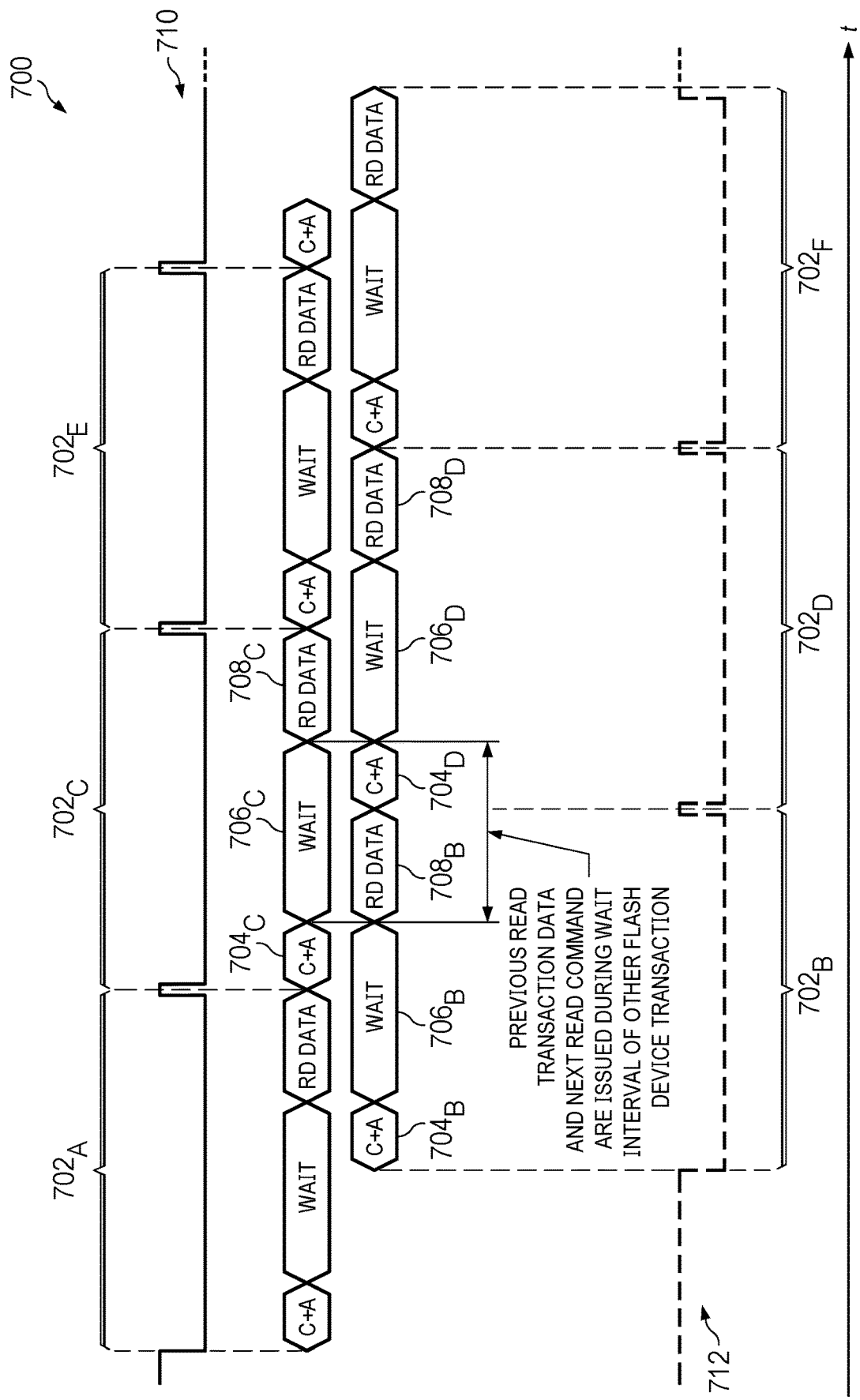
FIG. 7 is a timing diagram illustrating multiple interleaved read requests.

FIG. 7 is a timing diagram 700 illustrating multiple interleaved read transactions. For example, the timing diagram 700 illustrates an example first read transaction $702_A$, an example second read transaction $702_B$, an example third read transaction $702_C$, an example fourth read transaction $702_D$, an example fifth read transaction $702_E$, and an example sixth read transaction $702_F$. In the example of FIG. 7, the first read transaction $702_A$, the third read transaction $702_C$, and the fifth read transaction $702_E$ are addressed to the first storage 108. Additionally, the second read transaction $702_B$, the fourth read transaction $702_D$, and the sixth read transaction $702_F$ are addressed to the second storage 110.

In the illustrated example of FIG. 7, each of the first read transaction $702_A$, the second read transaction $702_B$, the third read transaction $702_C$, the fourth read transaction $702_D$, the fifth read transaction $702_E$, and the sixth read transaction $702_F$ includes an example command interval, an example address interval, an example wait interval, and an example read interval. In the example of FIG. 7, command intervals and address intervals are represented together as a command/address (C/A) interval. In the illustrated example of FIG. 7, the second read transaction $702_B$ is associated with an example second C/A interval $704_B$, an example second wait interval $706_B$, and an example second read interval $708_B$. Additionally, the third read transaction $702_C$ is associated with an example third C/A interval $704_C$, an example third wait interval $706_C$, and an example third read interval $708_C$. In the example of FIG. 7, the fourth read transaction $702_D$ is associated with an example fourth C/A interval $704_D$, an example fourth wait interval $706_D$, and an example fourth read interval $708_D$.

In the illustrated example of FIG. 7, each of the first read transaction $702_A$, the second read transaction $702_B$, the third read transaction $702_C$, the fourth read transaction $702_D$, the fifth read transaction $702_E$, and the sixth read transaction $702_F$ facilitates an XIP read request. Additionally, in the example of FIG. 7, each of the second C/A interval $704_B$, the third C/A interval $704_C$, and the fourth C/A interval $704_D$ is associated with one clock cycle. Additionally, each of the second wait interval $706_B$, the third wait interval $706_C$, and the fourth wait interval $706_D$ is associated with 20 clock cycles. In the example of FIG. 7, each of the second read interval $708_B$, the third read interval $708_C$, and the fourth read interval $708_D$ is associated with 16 clock cycles. As illustrated in FIG. 7, because the third wait interval $706_C$ of the third read transaction $702_C$ is greater than the sum of (a) the second read interval $708_B$ of the second read transaction $702_B$ and (b) the fourth C/A interval $704_D$ of the fourth read transaction $702_D$ (e.g., 20>16+3), the sequencing circuitry 224 sequences the third wait interval $706_C$ of the third read transaction $702_C$ to be interleaved (e.g., to overlap) with the second read interval $708_B$ of the second read transaction $702_B$ and the fourth C/A interval $704_D$ of the fourth read transaction $702_D$.

FIG. 7 illustrates an example of continuous pipelining where multiple read transactions are pipelined to read data from two storages (e.g., the first storage 108 and the second storage 110). Continuous pipelining of read transactions can continue until a wait interval of a current read transaction is not long enough for (a) a read interval of a previous read transaction and (b) a C/A interval of a next read transaction (queued after the current read transaction) to be interleaved beneath the wait interval of the current read transaction. As such, the continuous pipelining illustrated in FIG. 7 improves utilization of the shared bus 112 (e.g., by reducing (e.g., effectively eliminating) the number of clock cycles during which the shared bus 112 is idle). For example, the selection circuitry 242 cause transmission of an example first select signal 710 to the first storage 108 to facilitate the first read transaction $702_A$, the third read transaction $702_C$, and the fifth read transaction $702_E$. As illustrated in FIG. 7, the first select signal 710 remains asserted during each of the first read transaction $702_A$, the third read transaction $702_C$, and the fifth read transaction $702_E$, including the portions of the first read transaction $702_A$, the third read transaction $702_C$, and the fifth read transaction $702_E$ that are interleaved with the second read transaction $702_B$, the fourth read transaction $702_D$, and the sixth read transaction $702_F$. In the example of FIG. 7, a Hi-Z property of an interface of the first storage 108 causes the first storage 108 to disregard activities on the shared bus 112 during interleaved portions of read transactions. Additionally, the first select signal 710 asserts for a short duration and then deasserts at the end of each of the first read transaction $702_A$, the third read transaction $702_C$, and the fifth read transaction $702_E$ to indicate the start of the next read transaction to the first storage 108.

In the illustrated example of FIG. 7, the selection circuitry 242 causes transmission of an example second select signal 712 to the second storage 110 to facilitate the second read transaction $702_B$, the fourth read transaction $702_D$, and the sixth read transaction $702_F$. As illustrated in FIG. 7, the second select signal 712 remains asserted during each of the second read transaction $702_B$, the fourth read transaction $702_D$, and the sixth read transaction $702_F$, including the portions of the second read transaction $702_B$, the fourth read transaction $702_D$, and the sixth read transaction $702_F$ that are interleaved with the first read transaction $702_A$, the third read transaction $702_C$, and the fifth read transaction $702_E$. As such, the data requested via the second read transaction $702_B$ is returned from the second storage 110 and the command and address for the fourth read transaction $702_D$ are communicated to the second storage 110 during the third wait interval $706_C$ of the third read transaction $702_C$ to the first storage 108. In the example of FIG. 7, a Hi-Z property of an interface of the second storage 110 causes the second storage 110 to disregard activities on the shared bus 112 during interleaved portions of read transactions. Additionally, in the example of FIG. 7, the second select signal 712 asserts for a short duration and then deasserts at the end of each of the second read transaction $702_B$, the fourth read transaction $702_D$, and the sixth read transaction $702_F$ to indicate the start of the next read transaction to the second storage 110.

As described above, examples described herein improve utilization of a shared bus between storage devices. Table 1 illustrates example improvements for different sequential access requests. The example of Table 1 is based on accessing two OSPI DDR flash storages over a shared bus at 166 MHz where one clock cycle is 6 nanoseconds (ns) in length. For example, each OSPI DDR flash storage supports accessing 16 bits of data per clock cycle.

TABLE 1

| Consecutive Requests | Examples Described Herein | Gain Over Other Approaches |
|---|---|---|
| XIP Read Request, a Write Request, and Four Write Completion Polling Requests | 312 cycles | ~47% |
| Two XIP Read Requests | 55 cycles | ~30% |
| Three XIP Read Requests | 79 cycles | ~33% |
| N XIP Read Requests (N = 4) | 99 cycles | ~36% |

Figure 8A:
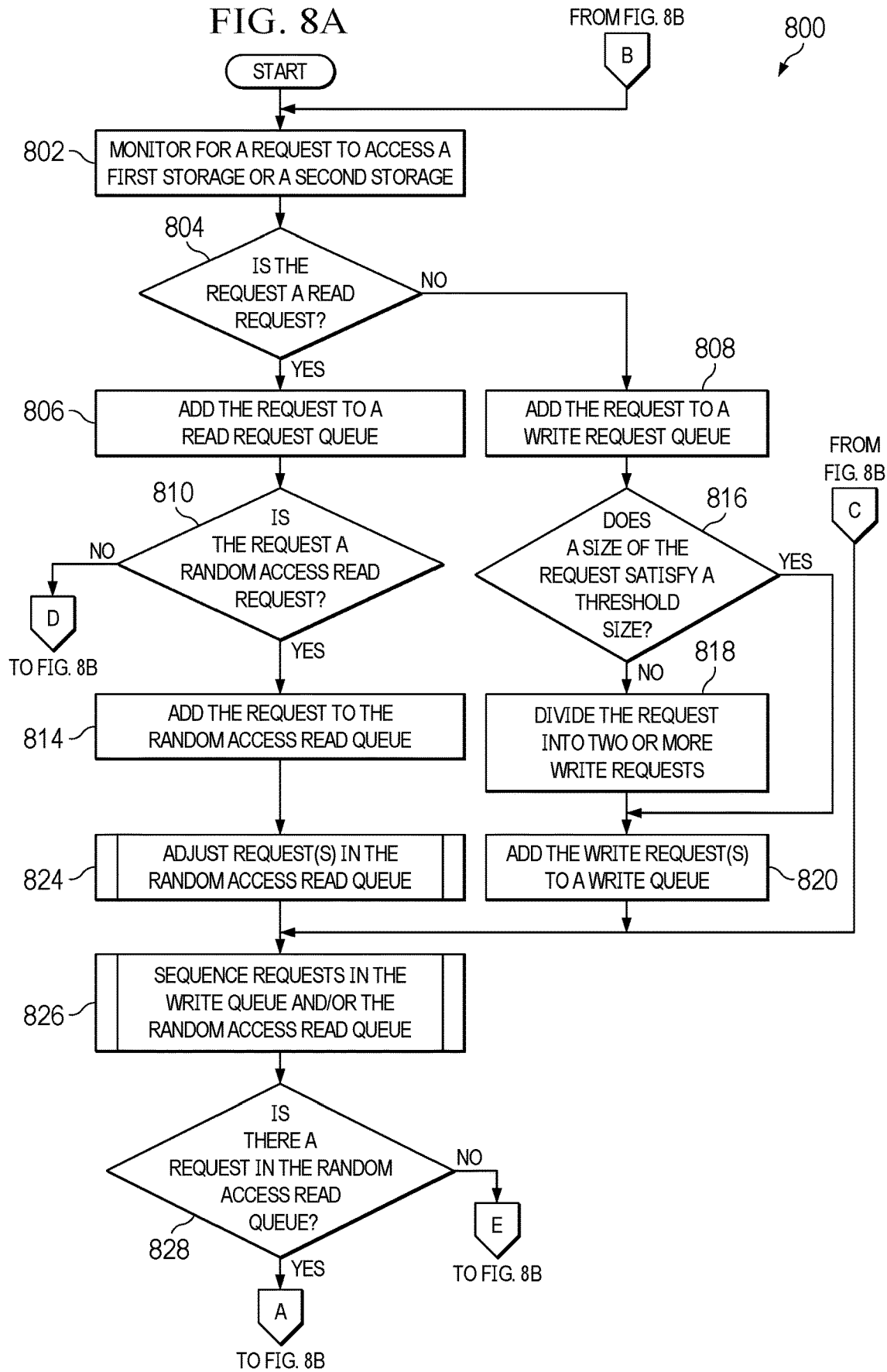
FIGS. 8A and 8B (referred to collectively as FIG. 8) are a flowchart representative of example machine-readable instructions and/or example operations that may be executed, instantiated, and/or performed using an example programmable circuitry implementation of the example bus controller of FIGS. 1 and/or 2.
Figure 8B:
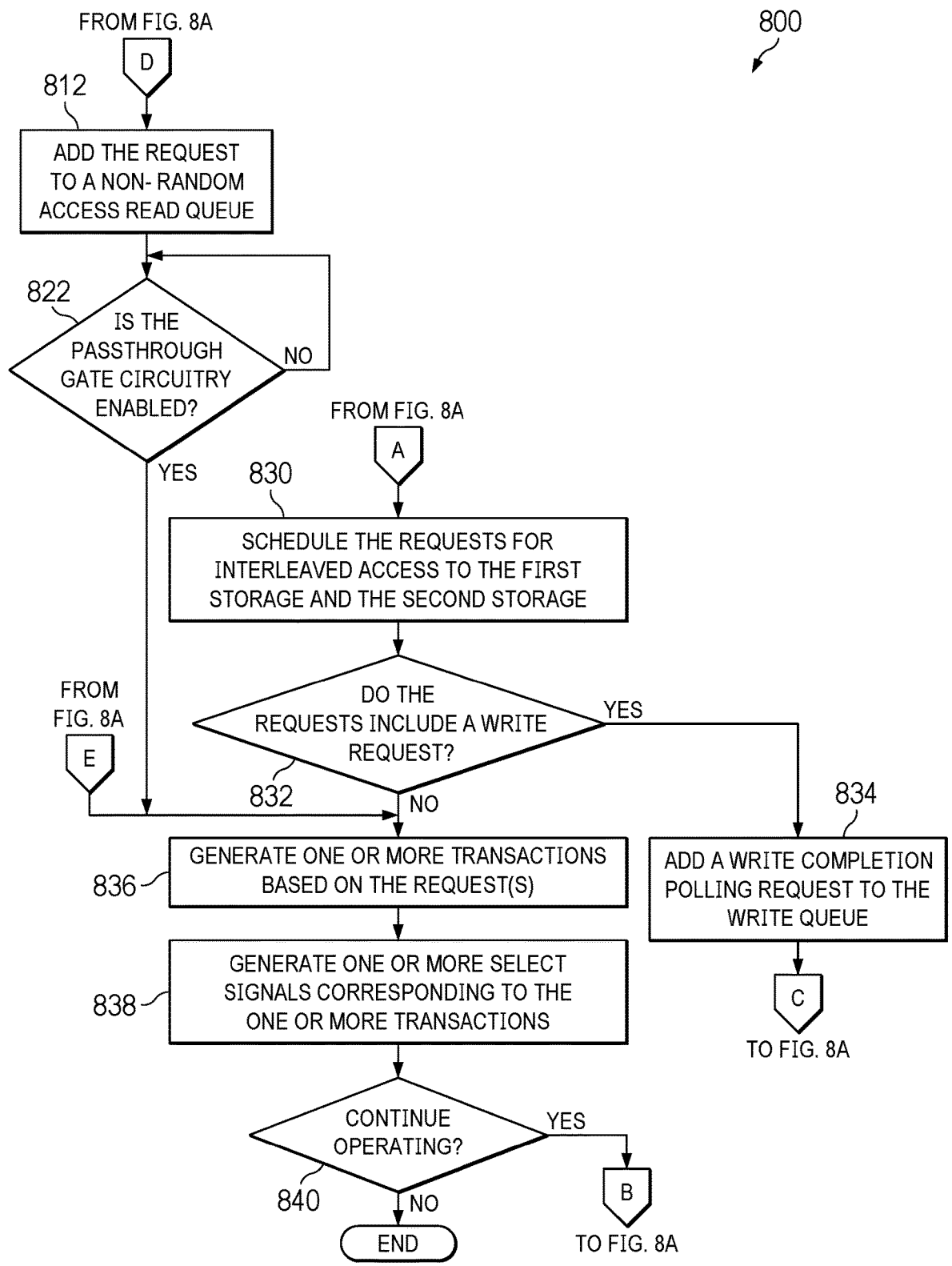
Figure 9:
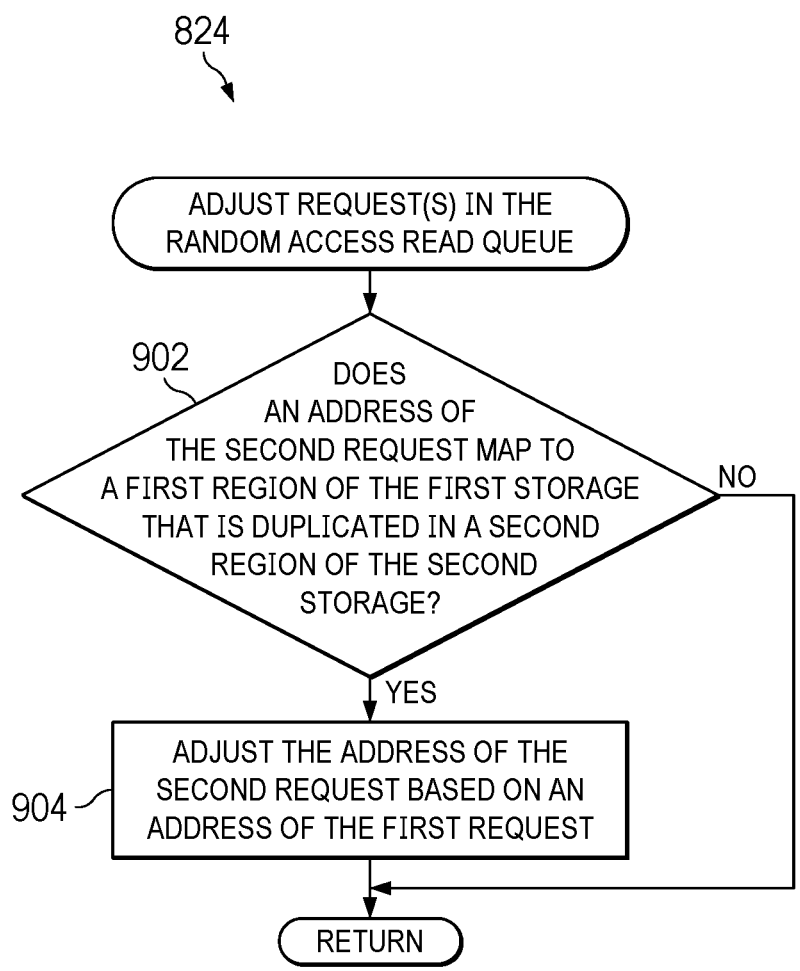
FIG. 9 is a flowchart representative of example machine-readable instructions and/or example operations that may be executed, instantiated, and/or performed using an example programmable circuitry implementation of the example adaptive read circuitry of FIG. 2.
Figure 10A:
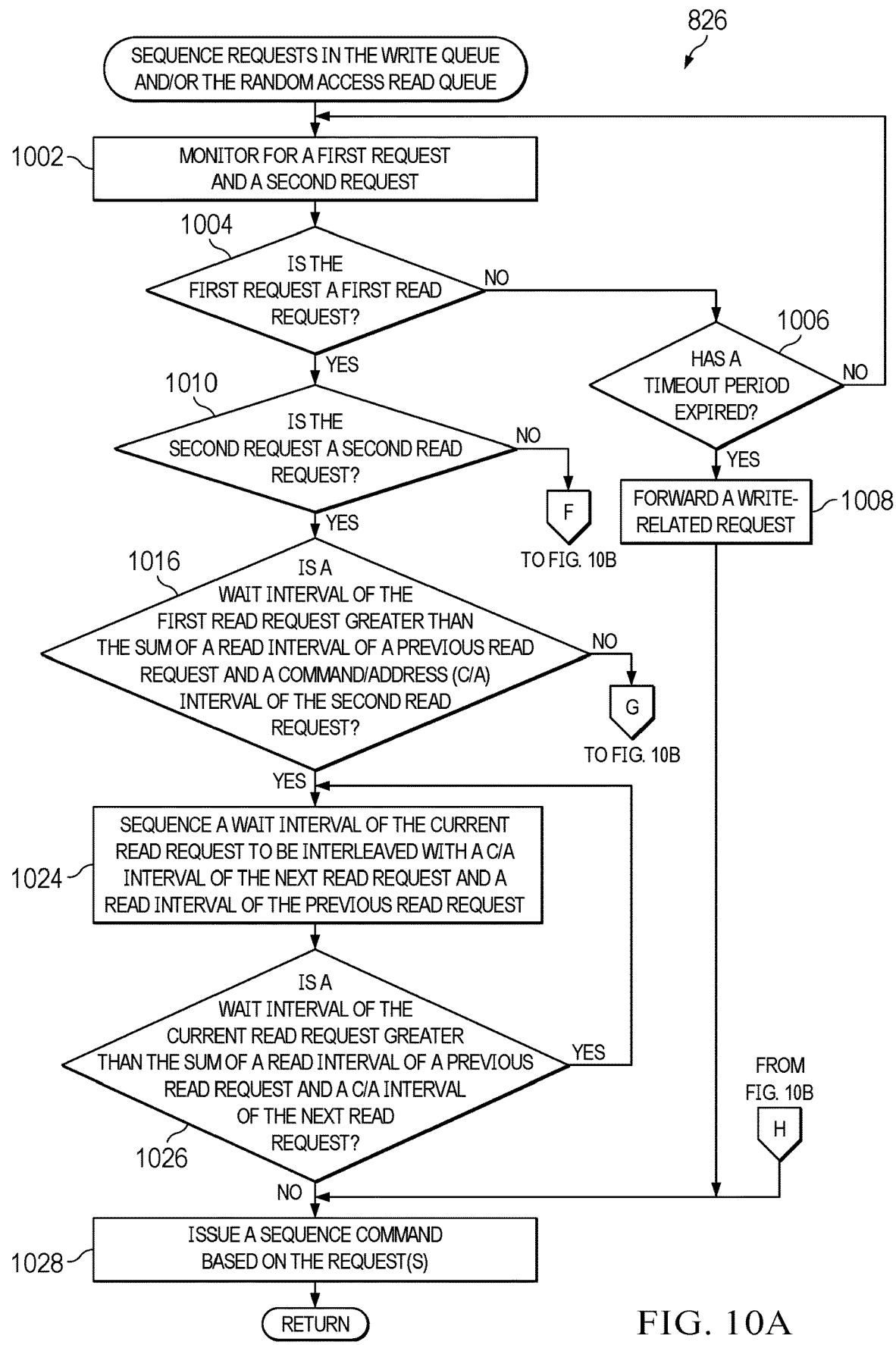
FIGS. 10A and 10B (referred to collectively as FIG. 10) are a flowchart representative of example machine-readable instructions and/or example operations that may be executed, instantiated, and/or performed using an example programmable circuitry implementation of the example sequencing circuitry of FIG. 2.
Figure 10B:
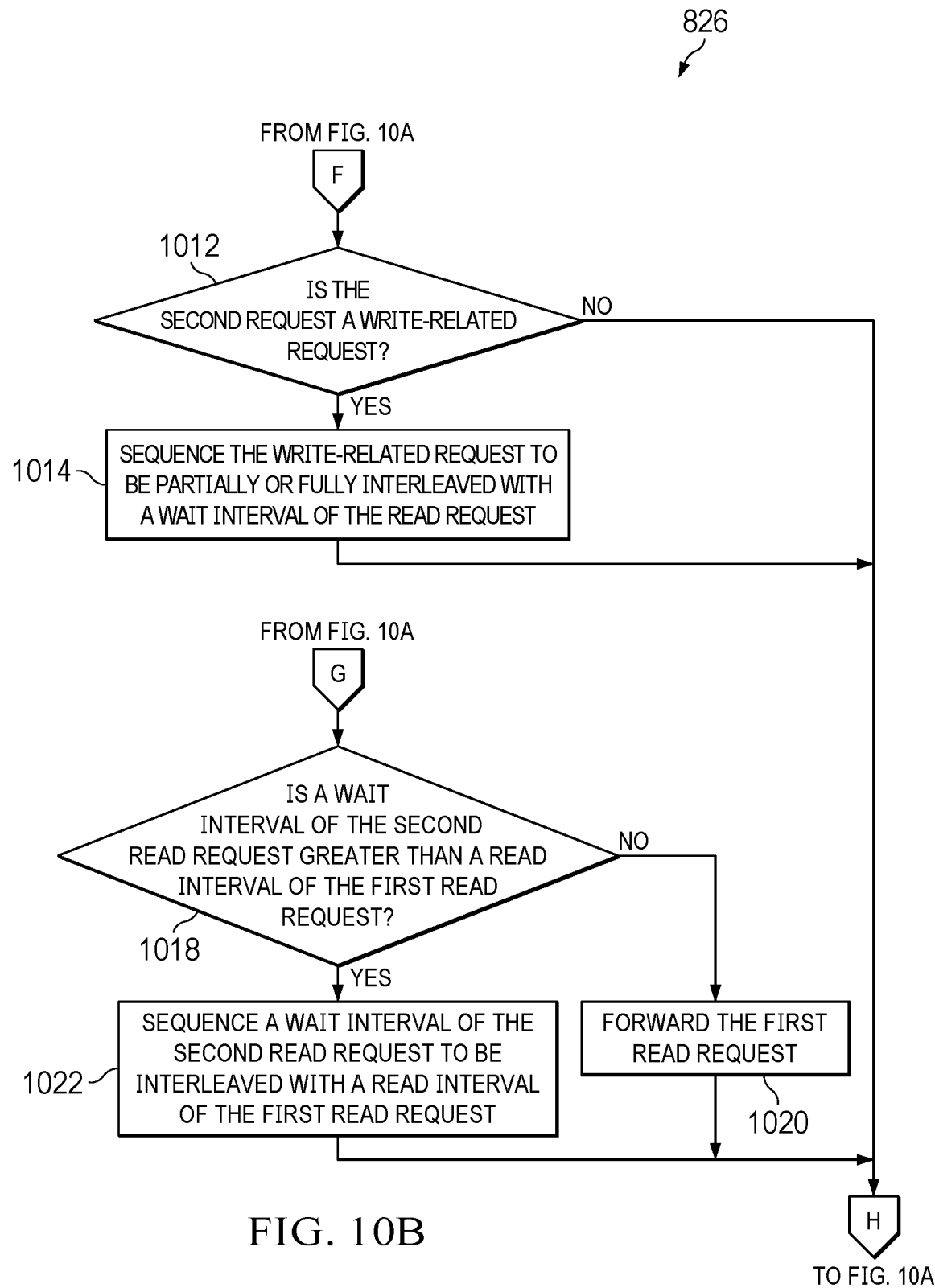

Flowchart(s) representative of example machine-readable instructions, which may be executed by programmable circuitry (e.g., instructions to cause programmable circuitry) to implement and/or instantiate the bus controller 104 of FIG. 2 and/or representative of example operations which may be performed by programmable circuitry to implement and/or instantiate the bus controller 104 of FIG. 2, are shown in FIGS. 8, 9, and 10. The machine-readable instructions may be one or more executable programs or portion(s) of one or more executable programs for execution by programmable circuitry such as the programmable circuitry 1112 shown in the example programmable circuitry platform 1100 described below in connection with FIG. 11 and/or may be one or more function(s) or portion(s) of functions to be performed by the example programmable circuitry (e.g., an FPGA) described below in connection with FIG. 12. In some examples, the machine-readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer-readable and/or machine-readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer-readable and/or machine-readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer-readable storage medium may include one or more mediums. Further, although the example program is described with reference to the flowchart(s) illustrated in FIGS. 8, 9, and/or 10, many other methods of implementing the example bus controller 104 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine-readable instructions described herein may be stored in one or more of a compressed format, an encrypted format, a fragmented format, a compiled format, an executable format, a packaged format, etc. Machine-readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine-executable instructions. For example, the machine-readable instructions may be fragmented and stored on one or more storage devices, disks and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of computer-executable and/or machine-executable instructions that implement one or more functions and/or operations that may together form a program such as that described herein.

In another example, the machine-readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable, computer-readable and/or machine-readable media, as used herein, may include instructions and/or program(s) regardless of the particular format or state of the machine-readable instructions and/or program(s).

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8, 9, and/or 10 may be implemented using executable instructions (e.g., computer-readable and/or machine-readable instructions) stored on one or more non-transitory computer-readable and/or machine-readable media. As used herein, the terms non-transitory computer-readable medium, non-transitory computer-readable storage medium, non-transitory machine-readable medium, and/or non-transitory machine-readable storage medium are expressly defined to include any type of computer-readable storage device and/or storage disk and to exclude propagating signals and to exclude transmission media. Examples of such non-transitory computer-readable medium, non-transitory computer-readable storage medium, non-transitory machine-readable medium, and/or non-transitory machine-readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer-readable storage device" and "non-transitory machine-readable storage device" are defined to include any physical (mechanical, magnetic and/or electrical) hardware to retain information for a time period, but to exclude propagating signals and to exclude transmission media. Examples of non-transitory computer-readable storage devices and/or non-transitory machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 8 is a flowchart representative of example machine-readable instructions and/or example operations 800 that may be executed, instantiated, and/or performed using an example programmable circuitry implementation of the example bus controller 104 of FIGS. 1 and/or 2. The example machine-readable instructions and/or the example operations 800 of FIG. 8 begin at block 802, at which the interface circuitry 202 monitors for a request to access a first storage or a second storage. For example, the interface circuitry 202 monitors for a request to access the first storage 108 or the second storage 110.

In the illustrated example of FIG. 8, when the interface circuitry 202 receives a request to access the first storage or the second storage, the machine-readable instructions and/or the operations 800 proceed to block 804. At block 804, the interface circuitry 202 determines whether the request is a read request. Based on (e.g., in response to) the interface circuitry 202 determining that the request is a read request (block 804: YES), the machine-readable instructions and/or the operations 800 proceed to block 806 where the interface circuitry 202 adds the request to a read request queue. For example, at block 806, the interface circuitry 202 adds the request to the read request queue 204. Based on (e.g., in response to) the interface circuitry 202 determining that the request is not a read request (block 804: NO), the machine-readable instructions and/or the operations 800 proceed to block 808 where the interface circuitry 202 adds the request to a write request queue. For example, at block 808, the interface circuitry 202 adds the request to the write request queue 206.

In the illustrated example of FIG. 8, at block 810, the sorting circuitry 228 determines whether the request is a random access read request. Based on (e.g., in response to) the sorting circuitry 228 determining that the request is not a random access read request (block 810: NO), the machine-readable instructions and/or the operations 800 proceed to block 812 where the sorting circuitry 228 adds the request to a non-random access read queue. For example, at block 812, the sorting circuitry 228 adds the request to the non-random access read queue 230. Based on (e.g., in response to) the sorting circuitry 228 determining that the request is a random access read request (block 810: YES), the machine-readable instructions and/or the operations 800 proceed to block 814 where the sorting circuitry 228 adds the request to a random access read queue. For example, at block 814, the sorting circuitry 228 adds the request to the random access read queue 232.

In the illustrated example of FIG. 8, at block 816, the dividing circuitry 234 determines whether a size of the request (queued in the write request queue) satisfies a threshold size. For example, at block 816, the dividing circuitry 234 compares a size of data to be written to the first storage 108 or the second storage 110 according to the write request to the threshold size. In the example of FIG. 8, when the dividing circuitry 234 determines that the size of data to be written to the first storage 108 or the second storage 110 is greater than the threshold size, the dividing circuitry 234 determines that the size of the request does not satisfy the threshold size. Alternatively, in the example of FIG. 8, when the dividing circuitry 234 determines that the size of data to be written to the first storage 108 or the second storage 110 is less than or equal to the threshold size, the dividing circuitry 234 determines that the size of the request satisfies the threshold size.

In the illustrated example of FIG. 8, based on (e.g., in response to) the dividing circuitry 234 determining that the size of the request does not satisfy the threshold size (block 816: NO), the machine-readable instructions and/or the operations 800 proceed to block 818 where the dividing circuitry 234 divides the request into two or more write requests. Based on (e.g., in response to) the dividing circuitry 234 determining that the size of the request satisfies the threshold size (block 816: YES), the machine-readable instructions and/or the operations 800 proceed to block 820. At block 820, the dividing circuitry 234 adds one or more write requests to a write queue. For example, at block 820, the dividing circuitry 234 adds the one or more write requests to the write queue 236.

In the illustrated example of FIG. 8, at block 822, the passthrough gate circuitry 238 determines whether the passthrough gate circuitry 238 is enabled. For example, at block 822, the passthrough gate circuitry 238 determines whether the one or more CPUs 106 of FIG. 1 have enabled the passthrough gate circuitry 238. Based on (e.g., in response to) the passthrough gate circuitry 238 determining that the passthrough gate circuitry 238 is not enabled (block 822: NO), the machine-readable instructions and/or the operations 800 return to block 822. Based on (e.g., in response to) the passthrough gate circuitry 238 determining that the passthrough gate circuitry 238 is enabled (block 822: YES), the machine-readable instructions and/or the operations 800 proceed to block 836. For example, based on the passthrough gate circuitry 238 determining that the passthrough gate circuitry 238 is enabled, the passthrough gate circuitry 238 forwards a non-random access read request from the non-random access read queue 230 to the transaction generation circuitry 240.

In the illustrated example of FIG. 8, at block 824, the adaptive read circuitry 222 adjusts one or more requests in the random access read queue. For example, at block 824, the adaptive read circuitry 222 adjusts one or more requests in the random access read queue 232. Example machine-readable instructions and/or example operations to implement the adaptive read circuitry 222 are illustrated and described in connection with FIG. 9. At block 826, the sequencing circuitry 224 sequences requests in the write queue and/or the random access read queue. Example machine-readable instructions and/or example operations to sequence requests in the write queue and/or the random access read queue are illustrated and described in connection with FIG. 10.

In the illustrated example of FIG. 8, at block 828, the sequencing circuitry 224 determines if there is a request in the random access read queue. Based on (e.g., in response to) the sequencing circuitry 224 determining that there is a request in the random access read queue (block 828: YES), the machine-readable instructions and/or the operations 800 proceed to block 830 where the sequencing circuitry 224 schedules two or more requests for interleaved access to the first storage and the second storage. Based on (e.g., in response to) the sequencing circuitry 224 determining that there is not a request in the random access read queue (block 828: NO), the machine-readable instructions and/or the operations 800 proceed to block 836. For example, based on the sequencing circuitry 224 determining that there is not a request in the random access read queue, the sequencing circuitry 224 forwards a write request to the transaction generation circuitry 240. Additionally or alternatively, based on the sequencing circuitry 224 determining that there is not a request in the random access read queue, the passthrough gate circuitry 238 forwards a non-random access read request to the transaction generation circuitry 240.

In the illustrated example of FIG. 8, at block 832, the write state machine circuitry 220 determines whether the requests to access the first storage or the second storage include a write request. For example, at block 832, the write state machine circuitry 220 accesses the write queue 236 to determine if the write queue 236 includes any write requests. Based on (e.g., in response to), the write state machine circuitry 220 determining that the requests to access the first storage or the second storage include a write request (block 832: YES), the machine-readable instructions and/or the operations 800 proceed to block 834 where the write state machine circuitry 220 adds a write completion polling request to the write queue. Based on (e.g., in response to), the write state machine circuitry 220 determining that the requests to access the first storage or the second storage do not include a write request (block 832: NO), the machine-readable instructions and/or the operations 800 proceed to block 836.

In the illustrated example of FIG. 8, at block 836, the transaction generation circuitry 240 generates one or more transactions based on one or more requests to access the first storage or the second storage. For example, a transaction refers to one or more signals that are communicated to storage to facilitate a request to access the storage. In the example of FIG. 8, at block 836 the transaction generation circuitry 240 generates one or more signals to communicate a command and address to one or more of the first storage or the second storage to generate transaction. Additionally, at block 836, the transaction generation circuitry 240 generates a transaction token to identify the transaction to one or more of the first storage or the second storage. At block 838, the selection circuitry 242 generates one or more select signals corresponding to the one or more transactions. At block 840, the interface circuitry 202 determines whether to continue operating. Based on the interface circuitry 202 determining that the bus controller 104 is to continue operating (block 840: YES), the machine-readable instructions and/or the operations 800 return to block 802. Based on the interface circuitry 202 determining that the bus controller 104 is to discontinue operating (block 840: NO), the machine-readable instructions and/or the operations 800 terminate.

FIG. 9 is a flowchart representative of example machine-readable instructions and/or example operations 824 that may be executed, instantiated, and/or performed using an example programmable circuitry implementation of the example adaptive read circuitry 222 of FIG. 2. As described above, the adaptive read circuitry 222 allows for back-to-back read requests to the same storage to be remapped on-the-fly to access a mirrored region of an alternate storage that includes duplicated data. For example, without the adaptive read circuitry 222, back-to-back requests to access the same storage would be serialized.

In the illustrated example of FIG. 9, the example machine-readable instructions and/or the example operations 824 of FIG. 9 begin at block 902, at which the adaptive read circuitry 222 determines whether an address of a second request maps to a first region of the first storage that is duplicated in a second region of the second storage. For example, for two read requests addressed to the first storage 108, the adaptive read circuitry 222 determines whether one or both of the read requests are addressed to the first region 304 that is mapped to the fourth region 310 in the second storage 110.

In the illustrated example of FIG. 9, based on (e.g., in response to), the adaptive read circuitry 222 determining that an address of a second request maps to a first region of the first storage that is duplicated in a second region of the second storage (block 902: YES), the machine-readable instructions and/or the operations 824 proceed to block 904. Based on (e.g., in response to), the adaptive read circuitry 222 determining that an address of a second request does not map to a first region of the first storage that is duplicated in a second region of the second storage (block 902: NO), the machine-readable instructions and/or the operations 824 return to the machine-readable instructions and/or the operations 800 of FIG. 8 at block 826. At block 904, the adaptive read circuitry 222 adjusts the address of the second request based on an address of the first request.

For example, when the first request is a read request to access data from the first storage 108 and the second request would otherwise attempt to access the first storage 108 during the first request, the adaptive read circuitry 222 translates the address of the second request to a mirrored region of the second storage 110 that includes data duplicated from the first storage 108. Alternatively, for example, when the first request is a read request to access data from the second storage 110, the adaptive read circuitry 222 translates the address of the second request to a mirrored region of the first storage 108 that includes data duplicated from the second storage 110. After block 904, the machine-readable instructions and/or the operations 824 return to the machine-readable instructions and/or the operations 800 of FIG. 8 at block 826.

FIG. 10 is a flowchart representative of example machine-readable instructions and/or example operations 826 that may be executed, instantiated, and/or performed using an example programmable circuitry implementation of the example sequencing circuitry 224 of FIG. 2. The example machine-readable instructions and/or the example operations 826 of FIG. 8 begin at block 1002, at which the sequencing circuitry 224 monitors for a first request and a second request. In the illustrated example of FIG. 10, when the sequencing circuitry 224 receives a first request and a second request, the machine-readable instructions and/or the operations 826 proceed to block 1004.

In the illustrated example of FIG. 10, at block 1004, the sequencing circuitry 224 determines whether the first request is a first read request. Based on the sequencing circuitry 224 determining that the first request is not a first read request (block 1004: NO), the machine-readable instruction and/or the operations 826 proceed to block 1006. At block 1006, the sequencing circuitry 224 determines whether a timeout period has expired without receiving a read request. Based on the sequencing circuitry 224 determining that a timeout period has not expired (block 1006: NO), the machine-readable instruction and/or the operations 826 return to block 1002. Based on the sequencing circuitry 224 determining that a timeout period has expired (block 1006: YES), the machine-readable instruction and/or the operations 826 proceed to block 1008 where the sequencing circuitry 224 forwards any write-related requests that have been received to be issued to the transaction generation circuitry 240.

Returning to block 1004, based on the sequencing circuitry 224 determining that the first request is a first read request (block 1004: YES), the machine-readable instruction and/or the operations 826 proceed to block 1010. At block 1010, the sequencing circuitry 224 determines whether the second request is a second read request. Based on the sequencing circuitry 224 determining that the second request is not a second read request (block 1010: NO), the machine-readable instruction and/or the operations 826 proceed to block 1012. At block 1012, the sequencing circuitry 224 determines whether the second request is a write-related request. For example, at block 1012, the sequencing circuitry 224 determines whether the second request is a write request or a write completion polling request.

In the illustrated example of FIG. 10, based on (e.g., in response to) the sequencing circuitry 224 determining that the second request is a write-related request (block 1012: YES), the machine-readable instruction and/or the operations 826 proceed to block 1014. At block 1014, the sequencing circuitry 224 sequences the write-related request to be partially or fully interleaved (e.g., to partially or fully overlap) with a wait interval of the read request. Based on (e.g., in response to) the sequencing circuitry 224 determining that the second request is not a write-related request (block 1012: NO), the machine-readable instruction and/or the operations 826 proceed to block 1028.

Returning to block 1010, based on the sequencing circuitry 224 determining that the second request is a second read request (block 1010: YES), the machine-readable instruction and/or the operations 826 proceed to block 1016. At block 1016, the sequencing circuitry 224 determines whether to initiate continuous pipelining. For example, at block 1016, the sequencing circuitry 224 determines whether a wait interval of the first read request is greater than the sum of a read interval of a previous read request and a command/address (C/A) interval of the second read request.

Based on (e.g., in response to) the sequencing circuitry 224 determining that a wait interval of the first read request is not greater than the sum of a read interval of a previous read request and a C/A interval of the second read request (block 1016: NO), the machine-readable instruction and/or the operations 826 proceed to block 1018. At block 1018, the sequencing circuitry 224 determines whether to initiate dual issue pipelining. For example, at block 1018, the sequencing circuitry 224 determines whether a wait interval of the second read request is greater than a read interval of the first read request. Based on the sequencing circuitry 224 determining that a wait interval of the second read request is not greater than a read interval of the first read request (block 1018: NO), the machine-readable instruction and/or the operations 826 proceed to block 1020 where the sequencing circuitry 224 forwards the first read request to be issued to the transaction generation circuitry 240.

In the illustrated example of FIG. 10, based on the sequencing circuitry 224 determining that a wait interval of the second read request is greater than a read interval of the first read request (block 1018: YES), the machine-readable instruction and/or the operations 826 proceed to block 1022. At block 1022, the sequencing circuitry 224 sequences a wait interval of the second read request to be interleaved (e.g., to overlap) with a read interval of the first read request. Returning to block 1016, based on (e.g., in response to) the sequencing circuitry 224 determining that a wait interval of the first read request is greater than the sum of a read interval of a previous read request and a C/A interval of the second read request (block 1016: YES), the machine-readable instruction and/or the operations 826 proceed to block 1024.

In the illustrated example of FIG. 10, at block 1024, the sequencing circuitry 224 sequences a wait interval of the current read request to be interleaved (e.g., to overlap) with a C/A interval of the next read request and a read interval of the previous read request. In other words, the sequencing circuitry 224 initiates continuous pipelining of the current read request (e.g., the Nth read request), the next read request (e.g., N+1th request), and the previous read request (e.g., the N−1th request). At block 1026, the sequencing circuitry 224 determines whether to continue continuous pipelining. For example, at block 1026, the sequencing circuitry 224 determines whether a wait interval of the current read request is greater than the sum of a read interval of a previous read request and a C/A interval of the next read request.

Based on the sequencing circuitry 224 determining that a wait interval of the current read request is greater than the sum of a read interval of a previous read request and a C/A interval of the next read request (block 1026: YES), the machine-readable instruction and/or the operations 826 return to block 1024. Based on the sequencing circuitry 224 determining that a wait interval of the current read request is not greater than the sum of a read interval of a previous read request and a C/A interval of the next read request (block 1026: NO), the machine-readable instruction and/or the operations 826 proceed to block 1028.

In the illustrated example of FIG. 10, at block 1028, the sequencing circuitry 224 issues a sequence command based on one or more requests. For example, a sequence command indicates how one or more transactions are to be issued to the first storage 108 and/or the second storage 110. Example sequence commands may include timing information (e.g., in the form of a number of clock cycles) for when a first transaction is to be issued relative to a second transaction. After block 1028, the machine-readable instruction and/or the operations 826 return to the machine-readable instructions and/or the operations 800 of FIG. 8 at block 828. As illustrated in FIG. 10, the sequencing circuitry 224 effectively pipelines requests to reduce cycles when the shared bus 112 is idle (e.g., to create an essentially uninterrupted dataflow over the shared bus 112).

Figure 11:
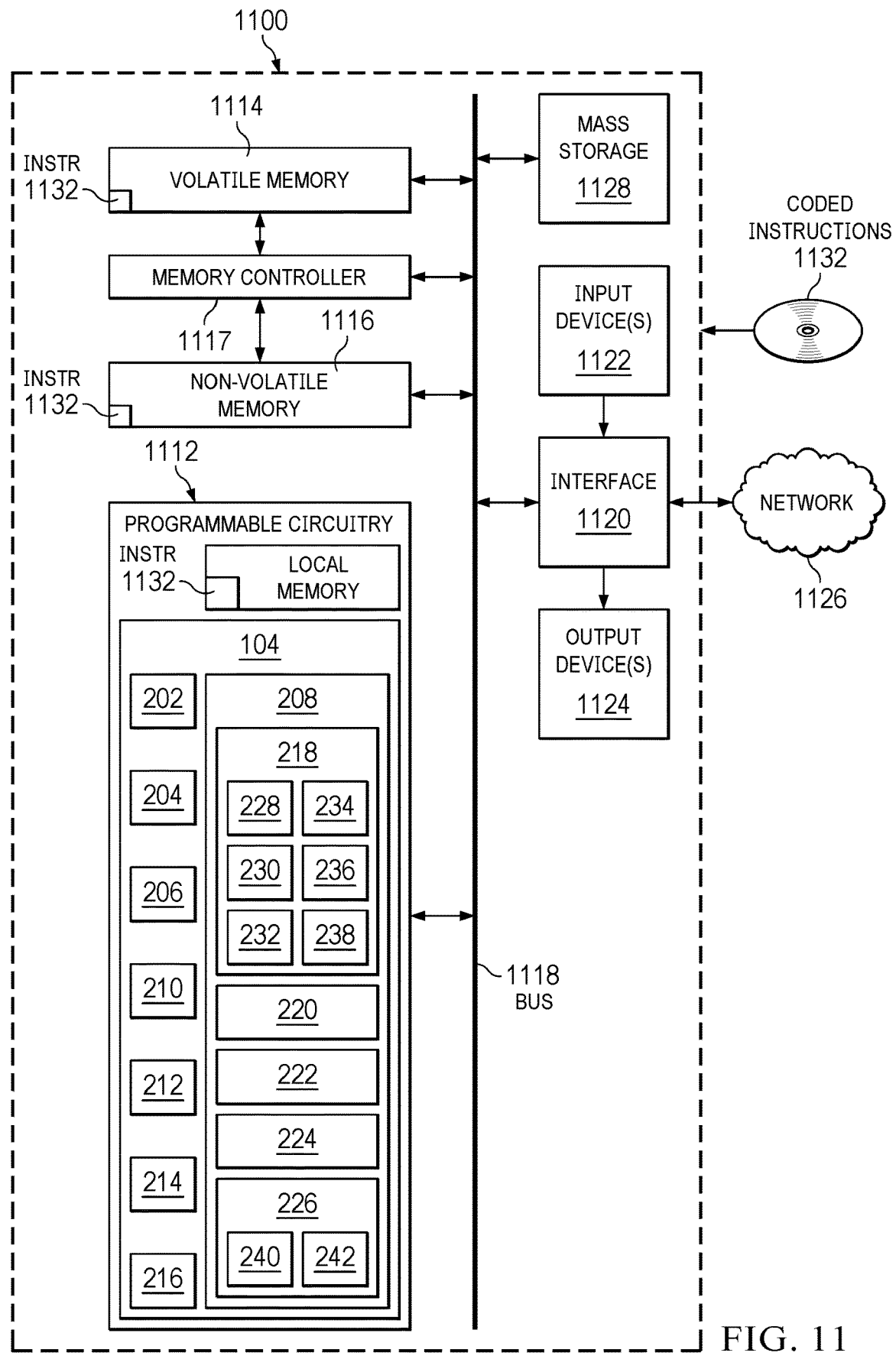
FIG. 11 is a block diagram of an example processing platform including programmable circuitry structured to execute, instantiate, and/or perform the example machine-readable instructions and/or perform the example operations of FIGS. 8, 9, and/or 10 to implement the bus controller 104 of FIGS. 1 and/or 2.

FIG. 11 is a block diagram of an example programmable circuitry platform 1100 structured to execute and/or instantiate the example machine-readable instructions and/or the example operations of FIGS. 8, 9, and/or 10 to implement the bus controller 104 of FIGS. 1 and/or 2. The programmable circuitry platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1100 of the illustrated example includes programmable circuitry 1112. The programmable circuitry 1112 of the illustrated example is hardware. For example, the programmable circuitry 1112 can be implemented by one or more integrated circuits, logic circuits, FPGAs, microprocessors, CPUs, GPUs, DSPs, and/or microcontrollers from any desired family or manufacturer. The programmable circuitry 1112 may be implemented by one or more semiconductor based (e.g., silicon based) devices. In this example, the programmable circuitry 1112 implements the example interface circuitry 202, the example read request queue 204, the example write request queue 206, the example interleaving circuitry 208, the example timing circuitry 210, the example data sampling circuitry 212, the example receive queue 214, the example transaction matching circuitry 216, and/or, more generally, the example bus controller 104 of FIG. 2, and/or the example request scheduling circuitry 218, the example write state machine circuitry 220, the example adaptive read circuitry 222, the example sequencing circuitry 224, the example prioritization circuitry 226, and/or, more generally, the example interleaving circuitry 208 of FIG. 2, and/or the example sorting circuitry 228, the example non-random access read queue 230, the example random access read queue 232, the example dividing circuitry 234, the example write queue 236, the example passthrough gate circuitry 238, and/or, more generally, the request scheduling circuitry 218 of FIG. 2, and/or the example transaction generation circuitry 240, the example selection circuitry 242, and/or, more generally, the example prioritization circuitry 226 of FIG. 2.

The programmable circuitry 1112 of the illustrated example includes a local memory 1113 (e.g., a cache, registers, etc.). The programmable circuitry 1112 of the illustrated example is in communication with main memory 1114, 1116, which includes a volatile memory 1114 and a non-volatile memory 1116, by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117. In some examples, the memory controller 1117 may be implemented by one or more integrated circuits, logic circuits, microcontrollers from any desired family or manufacturer, or any other type of circuitry to manage the flow of data going to and from the main memory 1114, 1116.

The programmable circuitry platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user (e.g., a human user, a machine user, etc.) to enter data and/or commands into the programmable circuitry 1112. The input device(s) 1122 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1100 of the illustrated example also includes one or more mass storage discs or devices 1128 to store firmware, software, and/or data. Examples of such mass storage discs or devices 1128 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine-readable instructions 1132, which may be implemented by the machine-readable instructions of FIGS. 8, 9, and/or 10, may be stored in the mass storage device 1128, in the volatile memory 1114, in the non-volatile memory 1116, and/or on at least one non-transitory computer-readable storage medium such as a CD or DVD which may be removable.

Figure 12:
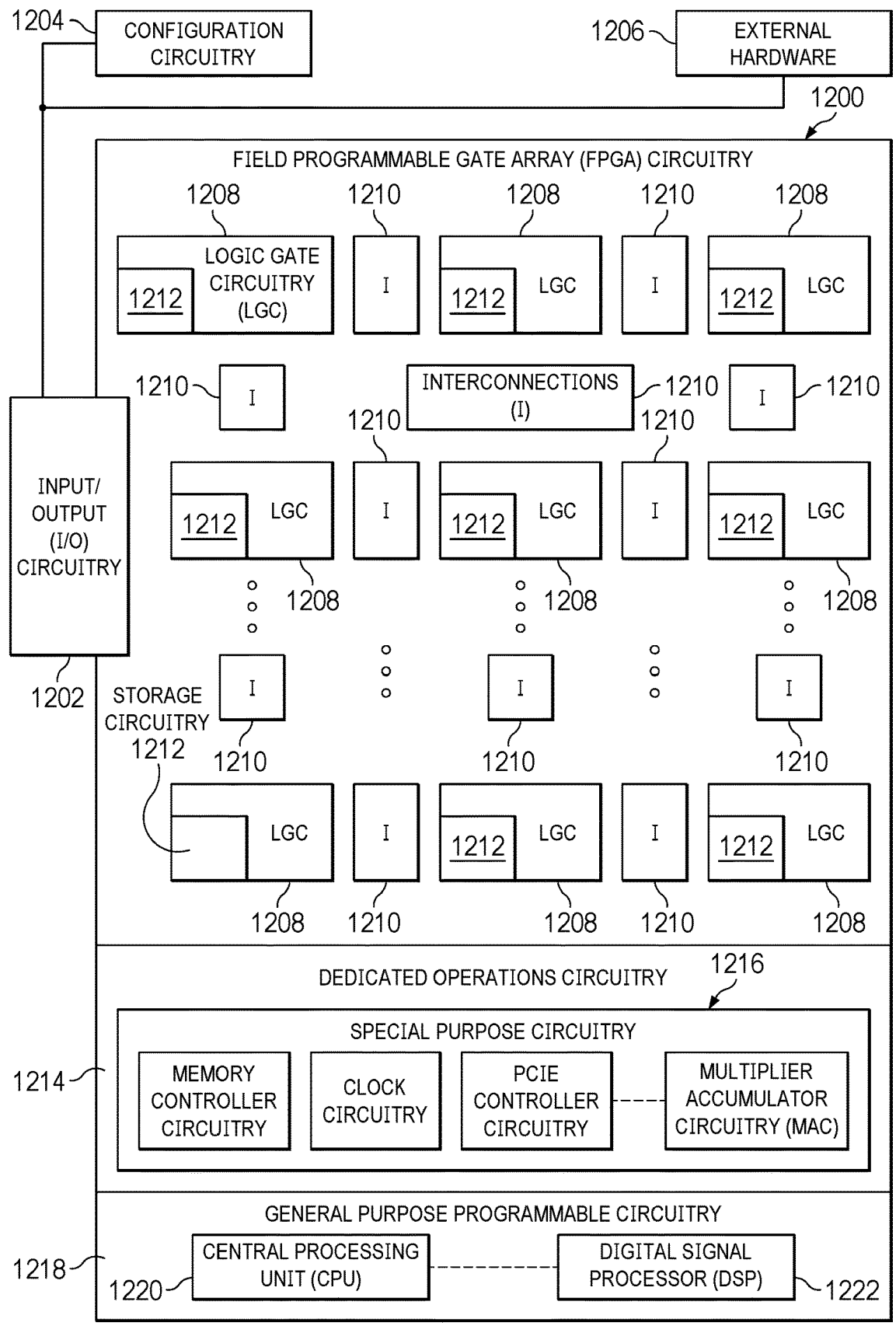
FIG. 12 is a block diagram of an example implementation of the programmable circuitry of FIG. 11.

FIG. 12 is a block diagram of an example implementation of the programmable circuitry 1112 of FIG. 11. In this example, the programmable circuitry 1112 is implemented by FPGA circuitry 1200. For example, the FPGA circuitry 1200 may be implemented by an FPGA. The FPGA circuitry 1200 can be used, for example, to perform operations that could otherwise be performed by an example microprocessor executing corresponding machine-readable instructions. However, once configured, the FPGA circuitry 1200 instantiates the operations and/or functions corresponding to the machine-readable instructions in hardware and, thus, can often execute the operations/functions faster than they could be performed by a general-purpose microprocessor executing the corresponding software.

More specifically, in contrast to a microprocessor (which is a general purpose device that may be programmed to execute machine-readable instructions but whose interconnections and logic circuitry are fixed once fabricated), the FPGA circuitry 1200 of the example of FIG. 12 includes interconnections and logic circuitry that may be configured, structured, programmed, and/or interconnected in different ways after fabrication to instantiate, for example, some or all of the operations/functions corresponding to the machine-readable instructions represented by the flowchart(s) of FIGS. 8, 9, and/or 10. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 8, 9, and/or 10. As such, the FPGA circuitry 1200 may be configured and/or structured to effectively instantiate some or all of the operations/functions corresponding to the machine-readable instructions of the flowchart(s) of FIGS. 8, 9, and/or 10 as dedicated logic circuits to perform the operations/functions corresponding to those software instructions in a dedicated manner analogous to an ASIC. Therefore, the FPGA circuitry 1200 may perform the operations/functions corresponding to the some or all of the machine-readable instructions of FIGS. 8, 9, and/or 10 faster than the general-purpose microprocessor can execute the same.

In the example of FIG. 12, the FPGA circuitry 1200 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1200 of FIG. 12 may access and/or load the binary file to cause the FPGA circuitry 1200 of FIG. 12 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1200 of FIG. 12 to cause configuration and/or structuring of the FPGA circuitry 1200 of FIG. 12, or portion(s) thereof.

The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may be implemented by interface circuitry that may obtain a binary file, which may be implemented by a bit stream, data, and/or machine-readable instructions, to configure the FPGA circuitry 1200, or portion(s) thereof. In some such examples, the configuration circuitry 1204 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1206 may be implemented by external hardware circuitry. For example, the external hardware 1206 may be implemented by a microprocessor.

The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations/functions that may correspond to at least some of the machine-readable instructions of FIGS. 8, 9, and/or 10 and/or other desired operations. The logic gate circuitry 1208 shown in FIG. 12 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations/functions. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example dedicated operations circuitry 1214. In this example, the dedicated operations circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIG. 12 illustrates an example implementation of the programmable circuitry 1112 of FIG. 11, many other approaches are contemplated. For example, FPGA circuitry may include an on-board CPU, such as one or more of the example CPU 1220 of FIG. 12. Therefore, the programmable circuitry 1112 of FIG. 11 may additionally be implemented by combining at least an example microprocessor and the example FPGA circuitry 1200 of FIG. 12. In some such hybrid examples, one or more cores of a microprocessor may execute a first portion of the machine-readable instructions represented by the flowchart(s) of FIGS. 8, 9, and/or 10 to perform first operation(s)/function(s), the FPGA circuitry 1200 of FIG. 12 may be configured and/or structured to perform second operation(s)/function(s) corresponding to a second portion of the machine-readable instructions represented by the flowcharts of FIGS. 8, 9, and/or 10, and/or an ASIC may be configured and/or structured to perform third operation(s)/function(s) corresponding to a third portion of the machine-readable instructions represented by the flowcharts of FIGS. 8, 9, and/or 10.

It should be understood that some or all of the circuitry of FIG. 2 may, thus, be instantiated at the same or different times. For example, same and/or different portion(s) of a microprocessor may be programmed to execute portion(s) of machine-readable instructions at the same and/or different times. In some examples, same and/or different portion(s) of the FPGA circuitry 1200 of FIG. 12 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, a microprocessor may execute machine-readable instructions in one or more threads executing concurrently and/or in series. In some examples, the FPGA circuitry 1200 of FIG. 12 may be configured and/or structured to carry out operations/functions concurrently and/or in series. Moreover, in some examples, some or all of the circuitry of FIG. 2 may be implemented within one or more virtual machines and/or containers executing on a microprocessor.

In some examples, the programmable circuitry 1112 of FIG. 11 may be in one or more packages. For example, a microprocessor and/or the FPGA circuitry 1200 of FIG. 12 may be in one or more packages. In some examples, an XPU may be implemented by the programmable circuitry 1112 of FIG. 11, which may be in one or more packages. For example, the XPU may include a CPU (e.g., a microprocessor, the CPU 1220 of FIG. 12, etc.) in one package, a DSP (e.g., the DSP 1222 of FIG. 12) in another package, a GPU in yet another package, and an FPGA (e.g., the FPGA circuitry 1200 of FIG. 12) in still yet another package.

Figure 13:
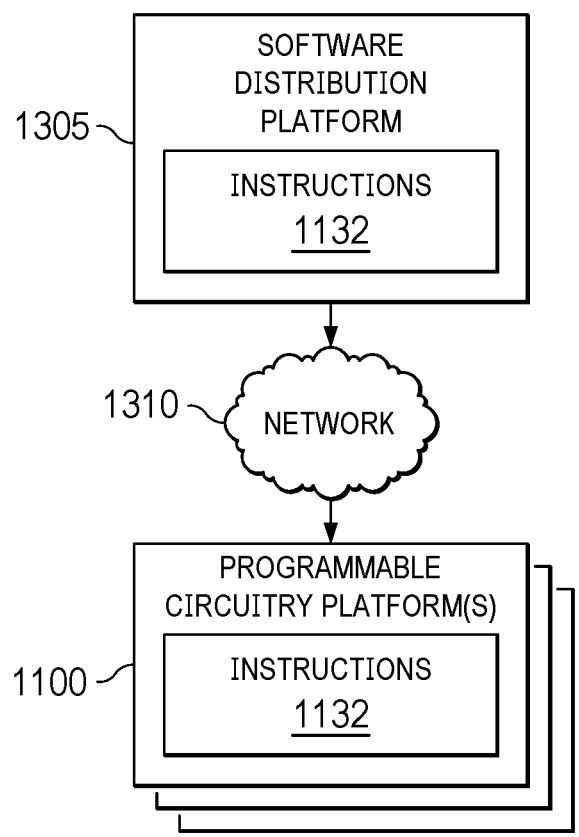
FIG. 13 is a block diagram of an example software/firmware/instructions distribution platform (e.g., one or more servers) to distribute software, instructions, and/or firmware (e.g., corresponding to the example machine-readable instructions of FIGS. 8, 9, and/or 10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine-readable instructions 1132 of FIG. 11 to other hardware devices (e.g., hardware devices owned and/or operated by third parties from the owner and/or operator of the software distribution platform) is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine-readable instructions 1132 of FIG. 11. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine-readable instructions 1132, which may correspond to the example machine-readable instructions of FIGS. 8, 9, and/or 10, as described above. The one or more servers of the example software distribution platform 1305 are in communication with an example network 1310, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 1132 from the software distribution platform 1305. For example, the software, which may correspond to the example machine-readable instructions of FIGS. 8, 9, and/or 10, may be downloaded to the example programmable circuitry platform 1100, which is to execute the machine-readable instructions 1132 to implement the bus controller 104 of FIGS. 1 and/or 2. In some examples, one or more servers of the software distribution platform 1305 periodically offer, transmit, and/or force updates to the software (e.g., the example machine-readable instructions 1132 of FIG. 11) to ensure improvements, patches, updates, etc., are distributed and applied to the software at the end user devices. Although referred to as software above, the distributed "software" could alternatively be firmware.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Numerical identifiers such as "first," "second," "third," etc. are used merely to distinguish between elements of substantially the same type in terms of structure and/or function. These identifiers, as used in the detailed description, do not necessarily align with those used in the claims.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero.

Modifications are possible in the described embodiments, and other embodiments are possible, within the scope of the claims.

From the foregoing, it will be appreciated that example systems, apparatus, articles of manufacture, and methods have been described that improve utilization of storage devices by reducing (e.g., minimizing) overhead for random access read requests. Examples described herein also effectively handle concurrent write requests and random access read requests which ensures reduced (e.g., minimal) performance degradation for write requests such that OTA operation can finish within a finite amount of time. Described systems, apparatus, articles of manufacture, and methods improve the efficiency of using a computing device by reducing (e.g., eliminating) cycle overhead for write operations while making the shared bus available for random access read requests. As such, XIP operation is unaffected by OTA operations. Described systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been described herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
a read queue to store a first read request to access a first storage;
sequencing circuitry coupled to the read queue, the sequencing circuitry to sequence a portion of a second request to access a second storage to be interleaved with a wait interval of the first read request, the second request queued after the first read request; and
prioritization circuitry coupled to the sequencing circuitry and coupled to the first storage and the second storage via a shared bus, the prioritization circuitry to:
generate a first transaction to access the first storage over the shared bus and a second transaction to access the second storage over the shared bus concurrently with the first transaction, the first transaction based on the first read request, the second transaction based on the second request; and
cause transmission of a first select signal to the first storage and a second select signal to the second storage, the first select signal to remain asserted during the first transaction including the portion of the first transaction that is interleaved with the second transaction, and the second select signal to remain asserted during the second transaction.

2. The apparatus of claim 1, wherein the sequencing circuitry is to, based on the second request being a write request or a write completion polling request, sequence the second request to be fully interleaved with the wait interval of the first read request.

3. The apparatus of claim 1, wherein the sequencing circuitry is to:
based on the second request being a second read request, determine whether the wait interval of the first read request is greater than a sum of a read interval of a third read request to access the first storage and a command/address (C/A) interval of the second read request, the third read request preceding the first read request; and
based on the wait interval of the first read request being greater than the sum of the read interval of the third read request and the C/A interval of the second read request, sequence the wait interval of the first read request to be interleaved with the read interval of the third read request and the C/A interval of the second read request.

4. The apparatus of claim 1, wherein the wait interval is a first wait interval, the second request is a second read request, and the sequencing circuitry is to:
determine whether a second wait interval of the second read request is greater than a read interval of the first read request; and
based on the second wait interval of the second read request being greater than the read interval of the first read request, sequence the second wait interval of the second read request to be interleaved with the read interval of the first read request.

5. The apparatus of claim 1, wherein the second request is a second read request, and the apparatus further includes adaptive read circuitry coupled to the read queue, the adaptive read circuitry to, based on a first address of the second read request mapping to a first region of the first storage that is duplicated in a second region of the second storage, replace the first address of the second read request with a second address that maps to the second region of the second storage.

6. The apparatus of claim 1, wherein the first read request is a request to access an instruction from the first storage.

7. The apparatus of claim 1, further including:
a second read queue to store a third read request to access the first storage or the second storage; and
passthrough gate circuitry coupled to the second read queue and the prioritization circuitry, the passthrough gate circuitry to:
based on the passthrough gate circuitry being enabled, dequeue the third read request from the second read queue to the prioritization circuitry; and
based on the passthrough gate circuitry being disabled, prevent dequeuing of the third read request from the second read queue to the prioritization circuitry.

8. A non-transitory machine-readable storage medium comprising instructions to cause programmable circuitry to:
access, from a read queue, a first read request to access a first storage;
sequence a portion of a second request to access a second storage to be interleaved with a wait interval of the first read request, the second request queued after the first read request;
generate a first transaction to access the first storage over a shared bus and a second transaction to access the second storage over the shared bus concurrently with the first transaction, the first transaction based on the first read request, the second transaction based on the second request; and
cause transmission of a first select signal to the first storage via a first select terminal and a second select signal to the second storage via a second select terminal, the first select signal to remain asserted during the first transaction including the portion of the first transaction that is interleaved with the second transaction, and the second select signal to remain asserted during the second transaction.

9. The non-transitory machine-readable storage medium of claim 8, wherein the instructions cause the programmable circuitry to, based on the second request being a write request or a write completion polling request, sequence the second request to be fully interleaved with the wait interval of the first read request.

10. The non-transitory machine-readable storage medium of claim 8, wherein the instructions cause the programmable circuitry to:
based on the second request being a second read request, determine whether the wait interval of the first read request is greater than a sum of a read interval of a third read request to access the first storage and a command/address (C/A) interval of the second read request, the third read request preceding the first read request; and
based on the wait interval of the first read request being greater than the sum of the read interval of the third read request and the C/A interval of the second read request, sequence the wait interval of the first read request to be interleaved with the read interval of the third read request and the C/A interval of the second read request.

11. The non-transitory machine-readable storage medium of claim 8, wherein the wait interval is a first wait interval, the second request is a second read request, and the instructions cause the programmable circuitry to:
- determine whether a second wait interval of the second read request is greater than a read interval of the first read request; and
- based on the second wait interval of the second read request being greater than the read interval of the first read request, sequence the second wait interval of the second read request to be interleaved with the read interval of the first read request.

12. The non-transitory machine-readable storage medium of claim 8, wherein the second request is a second read request, and the instructions cause the programmable circuitry to, based on a first address of the second read request mapping to a first region of the first storage that is duplicated in a second region of the second storage, replace the first address of the second read request with a second address that maps to the second region of the second storage.

13. The non-transitory machine-readable storage medium of claim 8, wherein the first read request is a request to access an instruction from the first storage.

14. The non-transitory machine-readable storage medium of claim 8, wherein the read queue is a first read queue, and the instructions cause the programmable circuitry to:
- based on a first signal indicating to bypass interleaving, dequeue a third read request from a second read queue; and
- based on a second signal indicating not to bypass interleaving, prevent dequeuing of the third read request from the second read queue.

15. A method comprising:
- accessing, from a read queue, a first read request to access a first storage;
- sequencing, by utilizing an instruction with programmable circuitry, a portion of a second request to access a second storage to be interleaved with a wait interval of the first read request, the second request queued after the first read request;
- generating, by utilizing an instruction with the programmable circuitry, a first transaction to access the first storage over a shared bus and a second transaction to access the second storage over the shared bus concurrently with the first transaction, the first transaction based on the first read request, the second transaction based on the second request; and
- causing, by utilizing an instruction with the programmable circuitry, transmission of a first select signal to the first storage and a second select signal to the second storage, the first select signal to remain asserted during the first transaction including the portion of the first transaction that is interleaved with the second transaction, and the second select signal to remain asserted during the second transaction.

16. The method of claim 15, further including, based on the second request being a write request or a write completion polling request, sequencing the second request to be fully interleaved with the wait interval of the first read request.

17. The method of claim 15, further including:
- based on the second request being a second read request, determining whether the wait interval of the first read request is greater than a sum of a read interval of a third read request to access the first storage and a command/address (C/A) interval of the second read request, the third read request preceding the first read request; and
- based on the wait interval of the first read request being greater than the sum of the read interval of the third read request and the C/A interval of the second read request, sequencing the wait interval of the first read request to be interleaved with the read interval of the third read request and the C/A interval of the second read request.

18. The method of claim 15, wherein the wait interval is a first wait interval, the second request is a second read request, and the method further includes:
- determining whether a second wait interval of the second read request is greater than a read interval of the first read request; and
- based on the second wait interval of the second read request being greater than the read interval of the first read request, sequencing the second wait interval of the second read request to be interleaved with the read interval of the first read request.

19. The method of claim 15, wherein the second request is a second read request, and wherein the method further includes:
- based on a first address of the second read request mapping to a first region of the first storage that is duplicated in a second region of the second storage, replacing the first address of the second read request with a second address that maps to the second region of the second storage.

20. The method of claim 15, wherein the read queue is a first read queue, and wherein the method further includes:
- based on a first signal indicating to bypass interleaving, dequeuing a third read request from a second read queue; and
- based on a second signal indicating not to bypass interleaving, preventing dequeuing of the third read request from the second read queue.

* * * * *